(12) United States Patent
Lee et al.

(10) Patent No.: US 12,248,642 B2
(45) Date of Patent: Mar. 11, 2025

(54) TOUCH DRIVING CIRCUIT AND TOUCH DISPLAY DEVICE

(71) Applicant: LG Display Co., Ltd, Seoul (KR)

(72) Inventors: Jeonghoon Lee, Gyeonggi-do (KR);
DeukSu Lee, Gyeonggi-do (KR);
Sangkyu Kim, Gyeonggi-do (KR);
SeungRok Shin, Gyeonggi-do (KR);
Yoonnara Jang, Gyeonggi-do (KR)

(73) Assignee: LG Display Co., Ltd. (KR)

( * ) Notice: Subject to any disclaimer, the term of this patent is extended or adjusted under 35 U.S.C. 154(b) by 0 days.

(21) Appl. No.: 18/544,601

(22) Filed: Dec. 19, 2023

(65) Prior Publication Data

US 2024/0256065 A1 Aug. 1, 2024

(30) Foreign Application Priority Data

Jan. 31, 2023 (KR) .......................... 10-2023-0012469

(51) Int. Cl.
*G06F 3/041* (2006.01)
*G06F 3/044* (2006.01)

(52) U.S. Cl.
CPC ........ *G06F 3/0412* (2013.01); *G06F 3/04166* (2019.05); *G06F 3/0443* (2019.05); *G06F 3/0446* (2019.05)

(58) Field of Classification Search
CPC .. G06F 3/0412; G06F 3/04166; G06F 3/0443; G06F 3/0446; G06F 2203/04112; G06F 3/04164; G06F 3/0416; H10K 59/40; H10K 59/873
See application file for complete search history.

(56) References Cited

U.S. PATENT DOCUMENTS

| 10,890,995 | B2* | 1/2021 | Lee .................. G06F 3/0412 |
| 2015/0268745 | A1* | 9/2015 | Li ..................... G06F 3/0412 345/173 |
| 2017/0249047 | A1* | 8/2017 | Shin .............. G06F 3/041661 |
| 2021/0124447 | A1* | 4/2021 | Jeong ............... G06F 3/0412 |
| 2022/0326831 | A1* | 10/2022 | Lee ................. G06F 3/04166 |

* cited by examiner

*Primary Examiner* — Jonathan A Boyd
(74) *Attorney, Agent, or Firm* — Fish & Richardson P.C.

(57) ABSTRACT

A method for sensing contactless touch using a touch sensor structure that senses contacting touch by operating some of touch electrode lines operating as touch driving electrodes and some of touch electrode lines operating as touch sensing electrodes upon contacting touch driving, as touch driving electrodes for sensing contactless touch, in a contactless touch driving period distinct from a contacting touch driving period.

20 Claims, 12 Drawing Sheets

TOUCH DRIVING CIRCUIT AND TOUCH DISPLAY DEVICE

CROSS-REFERENCE TO RELATED APPLICATION

This application claims the priority of Korean Patent Application No. 10-2023-0012469, filed on Jan. 31, 2023, which is hereby incorporated by reference in its entirety.

BACKGROUND

Field of the Disclosure

The present disclosure relates to a touch driving circuit and a touch display device.

Description of the Background

The display device may recognize a touch by the user's finger or pen on the display panel and provide a function of performing input processing based on the recognized touch.

For example, the display device may include a plurality of touch electrodes disposed on a display panel. The display device may drive a plurality of touch electrodes to detect a change in capacitance due to the user's touch and sense the user's touch.

Further, the display driving may detect the position on the display panel in a state in which the display panel is not touched by, e.g., the user's finger or recognize a motion on the display panel and perform input processing based on the recognized position or motion.

As the display driving detects the user's contacting touch or a position or motion in a state without the user's contact, the structure of the touch sensor included in the display driving may be complicated.

SUMMARY

Accordingly, the present disclosure is directed a touch driving circuit and a touch display device that substantially obviate one or more of problems due to limitations and disadvantages described above.

More specifically, the present disclosure is to provide a display driving including a touch sensor and a touch driving circuit, capable of easily recognizing the user's contacting touch on the display panel or a position or motion in a state without the user's contact.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

To achieve these and other advantages and in accordance with the present disclosure, as embodied and broadly described, a touch display device includes a substrate, a plurality of light emitting elements disposed in an active area on the substrate, an encapsulation layer on the plurality of light emitting elements, a plurality of first touch electrode lines disposed on the encapsulation layer and including two or more first touch electrodes electrically connected along a first direction, and a plurality of second touch electrode lines disposed on the encapsulation layer and including two or more second touch electrodes electrically connected along a second direction crossing the first direction.

A first touch driving signal may be supplied to the plurality of first touch electrode lines in a first touch driving period, and a second touch driving signal different from the first touch driving signal may be supplied to a first group of the plurality of first touch electrode lines and a first group of the plurality of second touch electrode lines in a second touch driving period.

In another aspect of the present disclosure, a touch display device includes a substrate, a plurality of first touch electrode lines positioned on the substrate and including two or more first touch electrodes electrically connected along a first direction, a plurality of second touch electrode lines positioned on the substrate and including two or more second touch electrodes electrically connected along a second direction crossing the first direction, and a touch driving circuit driving the plurality of first touch electrode lines and the plurality of second touch electrode lines, wherein the touch driving circuit outputs a contactless touch driving signal to a first group of the plurality of first touch electrode lines and a first group of the plurality of second touch electrode lines and outputs a constant voltage to a second group of the plurality of first touch electrode lines and a second group of the plurality of second touch electrode lines in a contactless touch driving period.

In a further aspect of the present disclosure, a touch driving circuit includes a first touch driving unit driving a plurality of first touch electrode lines including two or more first touch electrodes electrically connected along a first direction and a second touch driving unit driving a plurality of second touch electrode lines including two or more second touch electrodes electrically connected along a second direction crossing the first direction, wherein the first touch driving unit outputs a first touch driving signal to the plurality of first touch electrode lines in a first touch driving period and outputs a second touch driving signal different from the first touch driving signal to a first group of the plurality of first touch electrode lines and a constant voltage to a second group of the plurality of first touch electrode lines in a second touch driving period.

According to aspects of the disclosure, it is possible to detect the user's contacting touch or a position or motion in a state without the user's contact using touch electrodes disposed on the display panel.

According to aspects of the disclosure, a position or motion in a state without the user's contact may be detected without adding a separate sensor structure. Thus, a lightweight display driving may be implemented.

Further, a touch driving period may be time-divided to detect the user's contacting touch and a position or motion in a state without the user's contact. Thus, there may be provided a display driving capable of reducing power consumption.

It is to be understood that both the foregoing general description and the following detailed description are exemplary and explanatory and are intended to provide further explanation of the disclosure as claimed.

BRIEF DESCRIPTION OF THE DRAWINGS

The above and other features and advantages of the present disclosure will be more clearly understood from the following detailed description, taken in conjunction with the accompanying drawings, in which.

DETAILED DESCRIPTION

Figure 1:
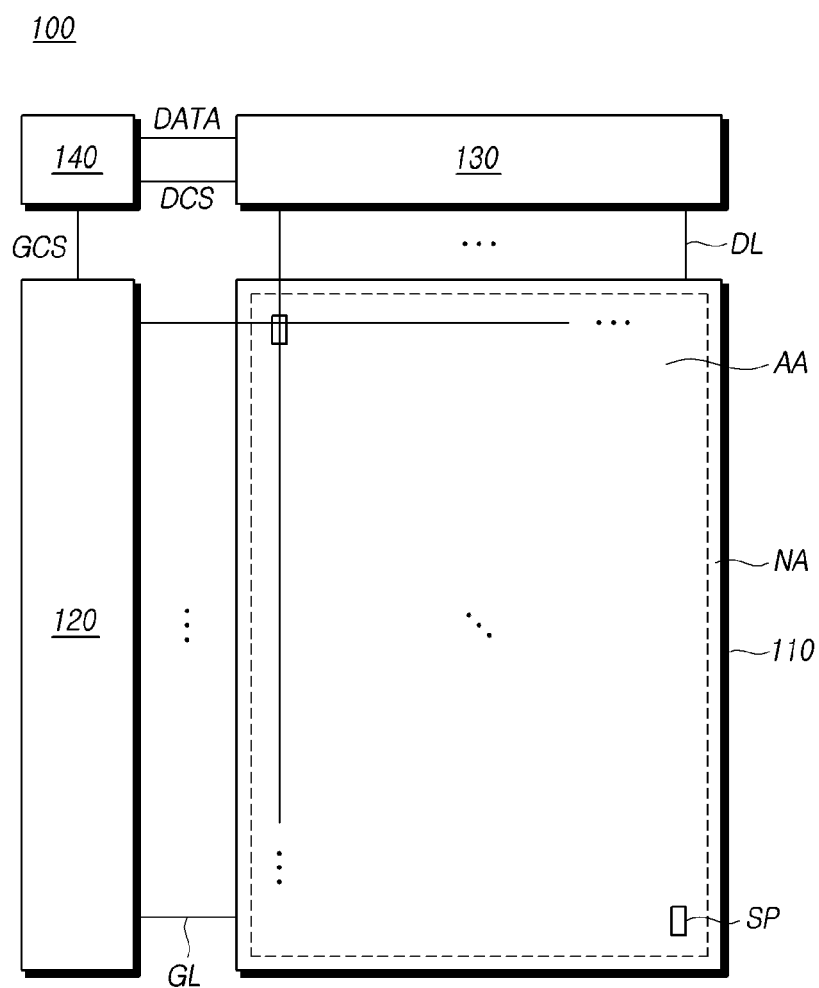
FIG. 1 is a view schematically illustrating a configuration of a touch display device according to aspects of the present disclosure.

In the following description of examples or aspects of the present disclosure, reference will be made to the accompanying drawings in which it is shown by way of illustration specific examples or aspects that may be implemented, and in which the same reference numerals and signs may be used to designate the same or like components even when they are shown in different accompanying drawings from one another. Further, in the following description of examples or aspects of the present disclosure, detailed descriptions of well-known functions and components incorporated herein will be omitted when it is determined that the description may make the subject matter in some aspects of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only may the first element "be directly connected or coupled to" or "directly contact or overlap" the second element, but a third element may also be "interposed" between the first and second elements, or the first and second elements may "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e. g., level, range, etc.) include a tolerance or error range that may be caused by various factors (e. g., process factors, internal or external impact, noise, etc.) even when a relevant description is not specified. Further, the term "may" fully encompasses all the meanings of the term "may".

Hereinafter, various aspects of the present disclosure will be described in detail with reference to accompanying drawings.

Figure 2:
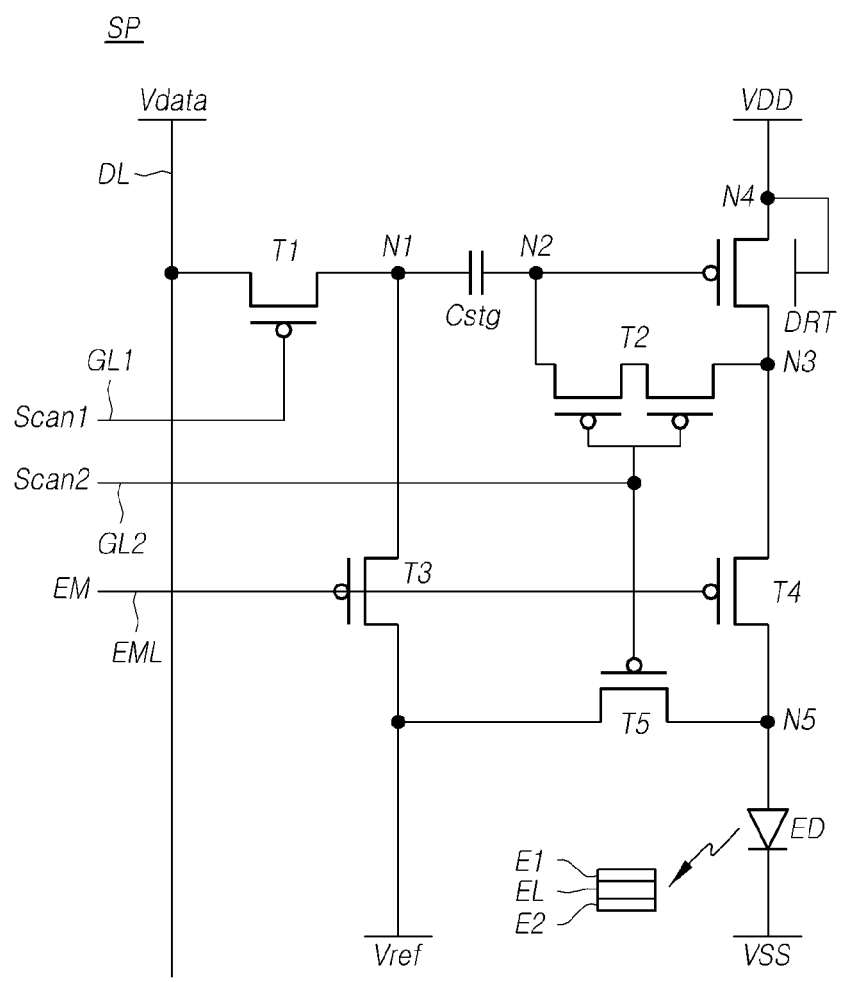
FIG. 2 is a view illustrating an example circuit structure of a subpixel included in a touch display device according to aspects of the present disclosure.

FIG. 1 is a view schematically illustrating a configuration of a touch display device 100 according to aspects of the disclosure. FIG. 2 is a view illustrating an example circuit structure of a subpixel SP included in a touch display device 100 according to aspects of the disclosure.

Referring to FIGS. 1 and 2, a touch display device 100 may include a display panel 110, a gate driving circuit 120 for driving the display panel 110, a data driving circuit 130, and a controller 140.

The touch display device 100 may further include a component for touch sensing in addition to a component for driving the display.

The display panel 110 may include an active area AA in which a plurality of subpixels SP are disposed and a non-active area NA positioned outside the active area AA. A plurality of gate lines GL and a plurality of data lines DL may be disposed on the display panel 110. The plurality of subpixels SP may be positioned in areas where the gate lines GL and the data lines DL intersect.

The gate driving circuit 120 may be controlled by the controller 140. The gate driving circuit 120 sequentially outputs scan signals to a plurality of gate lines GL disposed on the display panel 110 and may control driving timings of the plurality of subpixels SP.

The gate driving circuit 120 may include one or more gate driver integrated circuits (GDIC). The gate driving circuit 120 may be located only on one side of the display panel 110 or on each of two opposite sides according to driving methods.

Each gate driver integrated circuit GDIC may be connected to a bonding pad of the display panel 110 using a tape automated bonding (TAB) method or a chip on glass (COG) method. Alternatively, each gate driver integrated circuit GDIC may be implemented in a gate in panel (GIP) type and be disposed directly on the display panel 110. Alternatively, each gate driver integrated circuit GDIC may be integrated and disposed on the display panel 110. Each gate driver integrated circuit (GDIC) may also be implemented in a chip-on-film (COF) scheme to be mounted on a film connected to the display panel 110.

The data driving circuit 130 may receive image data DATA from the controller 140 and convert the image data DATA into an analog data voltage Vdata. The data driving circuit 130 may output the data voltage Vdata to each data line DL according to the timing of application of a scan signal through the gate line GL, so that each subpixel SP expresses a brightness according to the image data.

The data driving circuit 130 may include one or more source driver integrated circuits (SDICs). Each source driver integrated circuit (SDIC) may include, e.g., shift registers, latch circuits, digital-analog converters, and output buffers.

Each source driver integrated circuit SDIC may be connected to a bonding pad of the display panel 110 using a tape automated bonding (TAB) method or a chip on glass (COG) method. Alternatively, each source driver integrated circuit SDIC may be directly disposed on the display panel 110. Alternatively, each source driver integrated circuit SDIC may be integrated and disposed on the display panel 110. Alternatively, each source driver integrated circuit SDIC may be implemented by a chip on film (COF) method. In this case, each source driver integrated circuit SDIC may be mounted on a film connected to the display panel 110 and may be electrically connected to the display panel 110 through lines on the film.

The controller 140 may supply various control signals to the gate driving circuit 120 and the data driving circuit 130 and control the driving of the gate driving circuit 120 and the data driving circuit 130.

The controller 140 may be mounted on a printed circuit board or a flexible printed circuit. The controller 140 may be electrically connected to the gate driving circuit 120 and the data driving circuit 130 through a printed circuit board or a flexible printed circuit.

The controller 140 may control the gate driving circuit 120 to output a scan signal according to the timing set in each frame. The controller 140 may convert the image data received from the outside (e.g., a host system) according to a data signal format used by the data driving circuit 130 and output the converted image data DATA to the data driving circuit 130.

The controller 140 may receive, from the outside (e.g., host system), various timing signals including a vertical synchronization signal VSYNC, a horizontal synchronization signal HSYNC, an input data enable signal DE, and a clock signal CLK, together with the image data.

The controller 140 may generate a diversity of control signals using the timing signals received from the outside and output the control signals to the gate driving circuit 120 and the data driving circuit 130.

As an example, to control the gate driving circuit 120, the controller 140 may output various gate control signals GCS including a gate start pulse GSP, a gate shift clock GSC, and a gate output enable signal GOE.

The gate start pulse GSP may control the operation start timing of one or more gate driver integrated circuits GDICs constituting the gate driving circuit 120. The gate shift clock GSC is a clock signal commonly input to one or more gate driver integrated circuits GDICs and may control the shift timing of the scan signals. The gate output enable signal GOE may designate timing information about one or more gate driver integrated circuits GDICs.

To control the data driving circuit 130, the controller 140 may output various data control signals DCS including, e.g., a source start pulse SSP, a source sampling clock SSC, and a source output enable signal SOE, to the data driving circuit 130.

The source start pulse SSP may control the data sampling start timing of one or more source driver integrated circuits SDICs constituting the data driving circuit 130. The source sampling clock SSC may be a clock signal for controlling the sampling timing of data in each of one or more source driver integrated circuits SDIC. The source output enable signal SOE may control the output timing of the data driving circuit 130.

The touch display device 100 may further include a power management integrated circuit that supplies various voltages or currents to, or controls various voltages or currents to, the display panel 110, the gate driving circuit 120, the data driving circuit 130, and the like.

Each subpixel SP may be an area defined by the intersection of the gate line GL and the data line DL, and may have a liquid crystal layer disposed on each subpixel SP, or a light emitting element disposed on each subpixel SP, depending on the type of touch display device 100.

For example, when the touch display device 100 is an organic light emitting display device, organic light emitting diodes (OLEDs) and various circuit elements may be disposed in the plurality of subpixels SP. Each subpixel SP may display a brightness corresponding to image data by controlling the current supplied to the OLED by several circuit elements.

Alternatively, in some cases, a light emitting diode (LED), a micro light emitting diode (μLED), or a quantum dot light emitting diode (QLED) may be disposed in the subpixel SP.

Referring to FIG. 2, each of the plurality of subpixels SP may include a light emitting element ED. The subpixel SP may include a driving transistor DRT that controls driving current supplied to the light emitting element ED.

The subpixel SP may include at least one circuit element in addition to the light emitting element ED and the driving transistor DRT to drive the subpixel SP.

For example, the subpixel SP may include a first transistor T1, a second transistor T2, a third transistor T3, a fourth transistor T4, a fifth transistor T5, and a storage capacitor Cstg.

The example shown in FIG. 2 illustrates a 6T1C structure in which 6 transistors and 1 capacitor are disposed, but aspects of the disclosure are not limited thereto. Although the example shown in FIG. 2 illustrates a case where the transistors are P-type, at least some of the transistors disposed in the subpixel SP may be N-type.

Further, the transistor disposed in the subpixel SP may include, e.g., a semiconductor layer formed of low temperature polysilicon (LTPS) or a semiconductor layer formed of an oxide semiconductor. Further, in some cases, transistors including a semiconductor layer formed of low-temperature polycrystalline silicon and transistors including a semiconductor layer formed of an oxide semiconductor may be mixed and disposed in the subpixel SP.

The first transistor T1 may be electrically connected between the data line DL and the first node N1. The first transistor T1 may be controlled by the first scan signal Scan1 supplied through the first gate line GL1. The first transistor T1 may control application of the data voltage Vdata to the first node N1.

The second transistor T2 may be electrically connected between the second node N2 and the third node N3. The second node N2 may be the gate node of the driving transistor DRT. The third node N3 may be the drain node or source node of the driving transistor DRT. The second transistor T2 may be controlled by the second scan signal Scan2 supplied through the second gate line GL2. The second transistor T2 may perform an operation for compensating for a change in the threshold voltage of the driving transistor DRT.

The third transistor T3 may be electrically connected between the line to which the reference voltage Vref is supplied and the first node N1. The third transistor T3 may be controlled by the emission control signal EM supplied through the emission control line EML. The third transistor T3 may control discharge of the first node N1 or application of the reference voltage Vref to the first node N1.

The fourth transistor T4 may be electrically connected between the third node N3 and the fifth node N5. The fifth node N5 may be a node electrically connected to the light emitting element ED. The fourth transistor T4 may be controlled by the emission control signal EM supplied through the emission control line EML. The fourth transistor T4 may control the timing when driving current is supplied to the light emitting element ED.

The fifth transistor T5 may be electrically connected between a line to which the reference voltage Vref is supplied and the fifth node N5. The fifth transistor T5 may be controlled by the second scan signal Scan2 supplied through the second gate line GL2. The fifth transistor T5 may control discharge of the fifth node N5 or application of the reference voltage Vref to the fifth node N5.

The driving transistor DRT may be electrically connected between the fourth node N4 and the third node N3. The fourth node N4 may be electrically connected to a line to which the first driving voltage VDD is supplied. The first driving voltage VDD may be, e.g., a high-potential driving voltage. The fourth node N4 may be the source node or drain node of the driving transistor DRT.

The driving transistor DRT may be controlled by a voltage difference between the voltage of the second node N2 and the voltage of the fourth node N4. The driving transistor DRT may control the driving current supplied to the light emitting element ED.

The driving transistor DRT may include aback gate electrode electrically connected to the fourth node N4. The current output of the driving transistor DRT may be stably achieved by the back gate electrode electrically connected to the source node of the driving transistor DRT. For example, the back gate electrode may be disposed using a metal layer to block external light from entering the channel of the driving transistor DRT.

The light emitting element ED may be electrically connected between the fifth node N5 and the line to which the second driving voltage VSS is supplied. The second driving voltage VSS may be, e.g., a low-potential driving voltage.

The light emitting element ED may include a first electrode layer E1 electrically connected to the fifth node N5, a second electrode layer E2 to which the second driving voltage VSS is applied, and a light emitting layer EL disposed between the first electrode layer E1 and the second electrode layer E2.

The light emitting element ED may display a brightness according to the driving current supplied by the driving transistor DRT. The driving timing of the light emitting element ED may be controlled by the fourth transistor T4.

The driving timing of the subpixel SP shown in FIG. 2 is briefly described. A turn-on level second scan signal Scan2 may be supplied through the second gate line GL2. Since the transistor disposed in the subpixel SP is a P type, the turn-on level may be a low level.

The second transistor T2 and the fifth transistor T5 may be turned on by the turn-on level second scan signal Scan2.

Since the second transistor T2 is turned on, the second node N2 and the third node N3 may be electrically connected. A voltage obtained by reflecting the threshold voltage of the driving transistor DRT to the first driving voltage VDD may be applied to the second node N2 through the second transistor T2. Through this process, a change in the threshold voltage of the driving transistor DRT may be compensated for.

Since the fifth transistor T5 is turned on, the reference voltage Vref may be applied to the fifth node N5. The fifth node N5 may be initialized.

Thereafter, the turn-on level first scan signal Scan1 may be supplied through the first gate line GL1.

The first transistor T1 may be turned on by the turn-on level first scan signal Scan1.

Since the first transistor T1 is turned on, the data voltage Vdata may be applied to the first node N1.

The first driving voltage VDD, which reflects the data voltage Vdata and the threshold voltage of the driving transistor DRT may be applied to two opposite ends of the storage capacitor Cstg.

Thereafter, the turn-on level emission control signal EM may be supplied through the emission control line EML.

The third transistor T3 and the fourth transistor T4 may be turned on.

Since the third transistor T3 is turned on, the voltage of the first node N1 may be changed to the reference voltage Vref. The voltage of the second node N2 coupled to the first node N1 may be changed according to a change in voltage of the first node N1.

The voltage obtained by reflecting the threshold voltage of the driving transistor DRT and the data voltage Vdata to the first driving voltage VDD may be applied to the second node N2, and the first driving voltage VDD may be applied to the fourth node N4. The difference between the voltage of the second node N2 and the voltage of the fourth node N4 may be the voltage which reflects the data voltage Vdata and the threshold voltage of the driving transistor DRT. A driving current corresponding to the data voltage Vdata may be supplied by the driving transistor DRT.

Since the fourth transistor DRT is turned on, the driving current supplied by the driving transistor DRT may be supplied to the light emitting element ED.

The light emitting element ED may represent a brightness according to the driving current, and the subpixel SP including the light emitting element ED may display an image corresponding to image data.

Further, aspects of the present disclosure may implement a touch sensor structure on the display panel 110 that displays images, providing the function for sensing the user's touch on the display panel 110.

Figure 3:
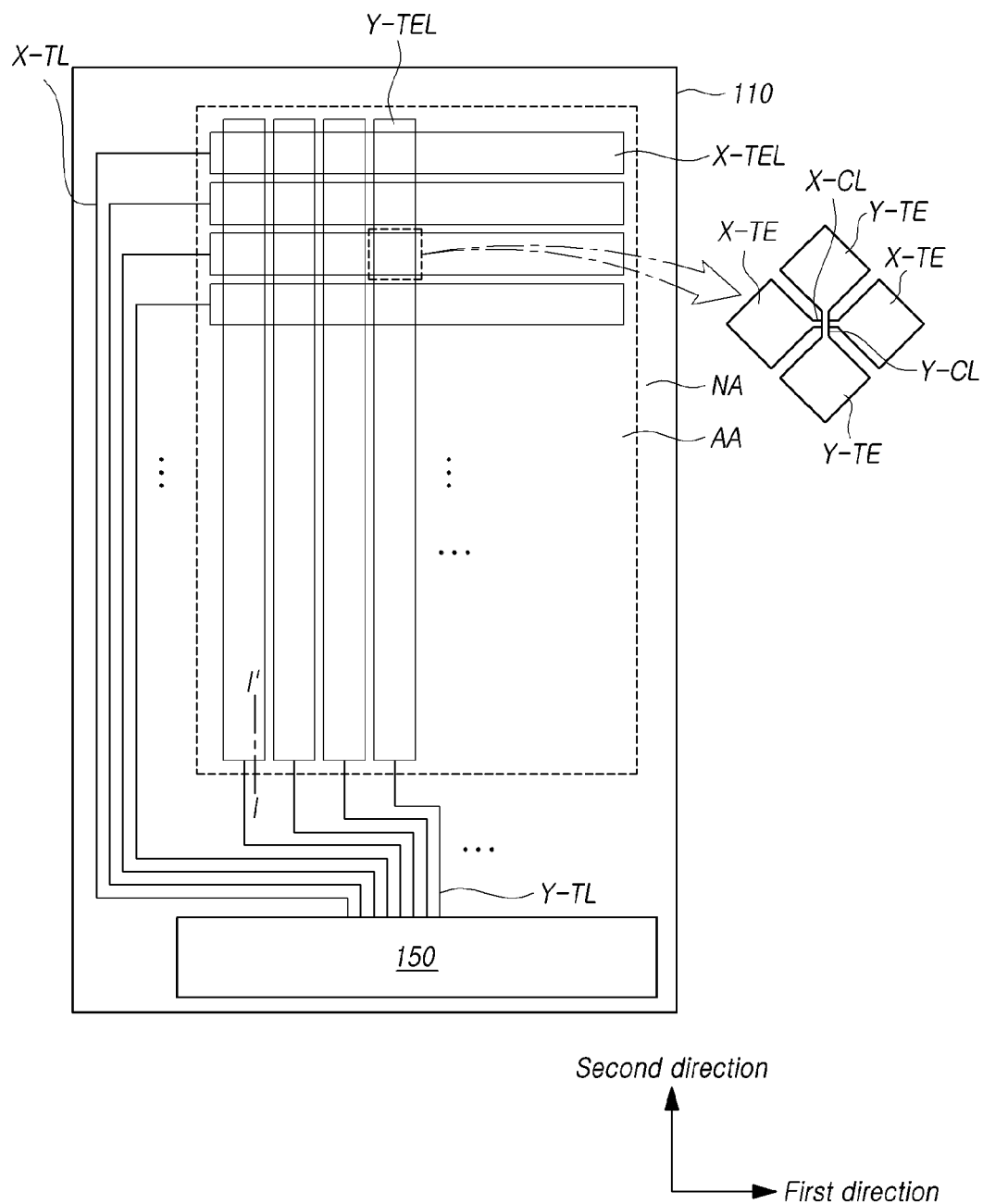
FIG. 3 is a view illustrating an example of a touch sensor structure included in a touch display device according to aspects of the present disclosure.
Figure 4:
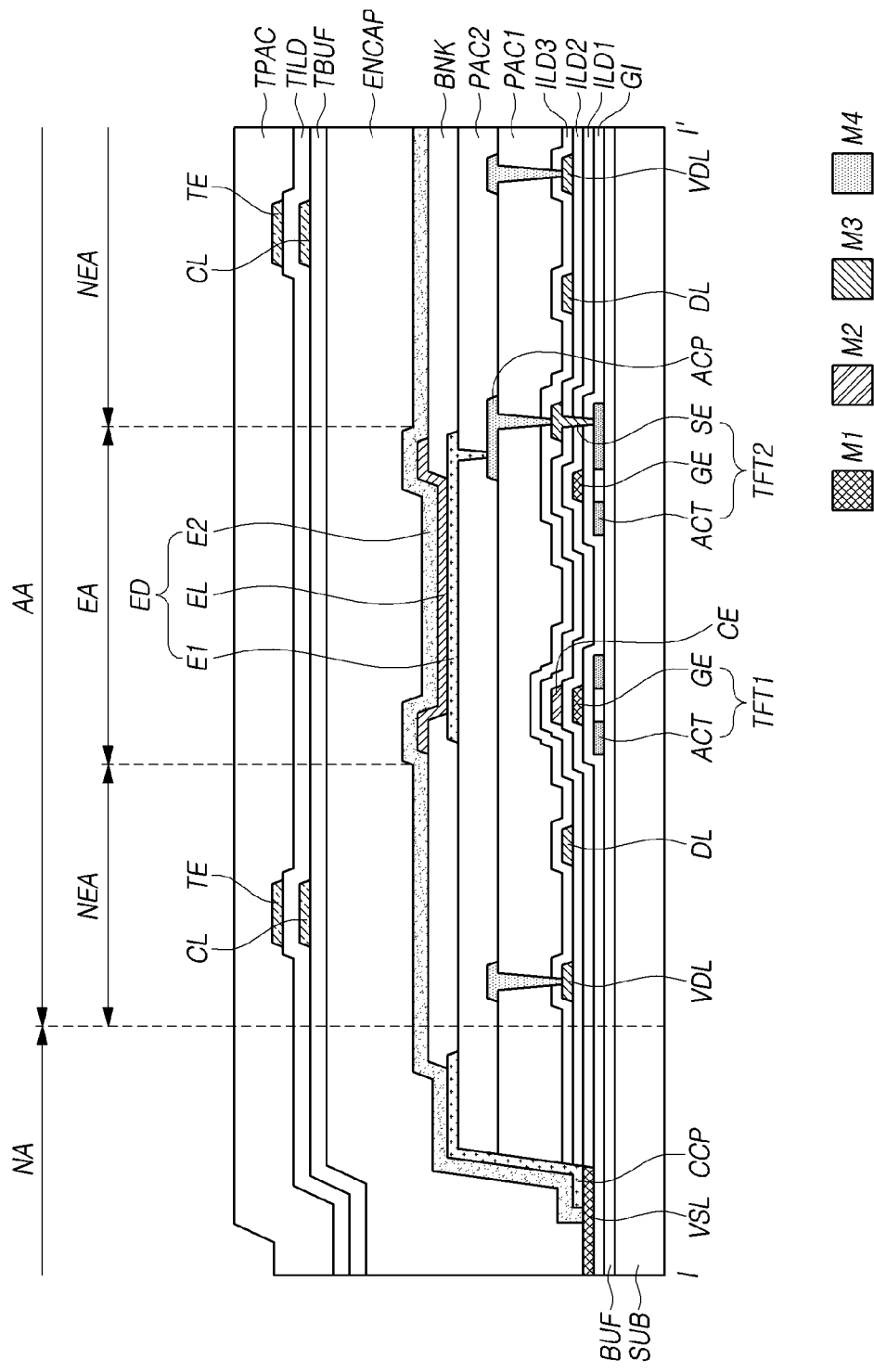
FIG. 4 is a cross-sectional view illustrating an example structure, taken along line I-I' of FIG. 3.

FIG. 3 is a view illustrating an example of a touch sensor structure included in a touch display device 100 according to aspects of the disclosure. FIG. 4 is a cross-sectional view illustrating an example structure, taken along line I-I' of FIG. 3;

Referring to FIG. 3, the touch display device 100 may include a plurality of touch electrode lines TEL and a plurality of touch routing lines TL disposed on the display panel 110. The touch display device 100 may include a touch driving circuit 150 that drives the plurality of touch electrode lines TEL and the plurality of touch routing lines TL.

Each of the plurality of touch electrode lines TEL may be electrically connected to the touch driving circuit 150 through a touch routing line TL. The touch driving circuit 150 may be disposed separately or, in some cases, it may be integrated with a circuit for display driving. For example, the touch driving circuit 150 may be integrated with the data driving circuit 130.

Each of the plurality of touch electrode lines TEL may include a plurality of touch electrodes TE electrically connected to each other along one direction. Further, each of the plurality of touch electrode lines TEL may include a plurality of touch electrode connection patterns CL electrically connecting the plurality of touch electrodes TE to each other.

For example, each of the plurality of X-touch electrode lines X-TEL may include a plurality of X-touch electrodes X-TE arranged along a first direction and a plurality of X-touch electrode connection patterns X-CL electrically connecting the plurality of X-touch electrodes X-TE.

For example, each of the plurality of Y-touch electrode lines Y-TEL may include a plurality of Y-touch electrodes Y-TE arranged along a second direction crossing the first direction and a plurality of Y-touch electrode connection patterns Y-CL electrically connecting the plurality of Y-touch electrodes Y-TE.

In the disclosure, the X-touch electrode line X-TEL may be referred to as a first touch electrode line, and the X-touch electrode X-TE may be referred to as a first touch electrode. In the disclosure, the Y-touch electrode line Y-TEL may be referred to as a second touch electrode line, and the Y-touch electrode Y-TE may be referred to as a second touch electrode.

Alternatively, in some cases, in the disclosure, the X-touch electrode line X-TEL and the X-touch electrode X-TE may be referred to as a second touch electrode line and a second touch electrode, respectively, and the Y-touch electrode line Y-TEL and The Y-touch electrode Y-TE may be referred to as a first touch electrode line and a first touch electrode, respectively.

The X-touch electrode line X-TEL and the Y-touch electrode line Y-TEL may be disposed on different layers. Alternatively, the X-touch electrodes X-TE and Y-touch electrodes Y-TE may be disposed on the same layer. In this case, either the X-touch electrode connection pattern X-CL or the Y-touch electrode connection pattern Y-CL may be disposed on a different layer from the touch electrode TE.

For example, the touch electrode TE may have a rectangular shape, but is not limited thereto.

The touch electrode TE may be formed of a transparent conductive material and may be positioned without interfering with the image display capabilities of the display panel 110.

Alternatively, the touch electrode TE may be formed of an opaque metal. In this case, the touch electrode TE may have an open area corresponding to the emission area of the light emitting element ED disposed on the display panel 110. For example, the touch electrode TE may be implemented in a mesh shape and disposed to avoid the emission area.

Referring to FIG. 4, the substrate SUB may include an active area AA in which a plurality of subpixels SP are disposed and a non-active area NA positioned outside the active area AA.

The active area AA may include an emission area EA in which light is emitted by the light emitting element ED and a non-emission area NEA that is an area other than the emission area EA.

A buffer layer BUF may be disposed on the substrate SUB.

A thin film transistor TFT may be disposed on the buffer layer BUF.

The thin film transistor TFT may include an active layer ACT and a gate electrode GE. The thin film transistor TFT may include a source electrode SE and a drain electrode (not shown).

The active layer ACT may be positioned on the buffer layer BUF. The active layer ACT may be formed of a semiconductor material. The active layer ACT may be formed of amorphous silicon or polycrystalline silicon.

A gate insulation layer GI may be disposed on the active layer ACT.

The gate electrode GE may be positioned on the gate insulation layer GI. The gate electrode GE may be disposed using the first metal layer M1.

Several signal lines may be disposed using the first metal layer M1.

For example, the second power line VSL supplying the second driving voltage VSS may be disposed using the first metal layer M1.

The second power line VSL may be positioned in the non-active area NA. In some cases, the second power line VSL may be positioned in the active area AA.

The second power line VSL may be electrically connected to the second electrode layer E2. A second electrode connection pattern CCP may be positioned in at least a partial area between the second power line VSL and the second electrode layer E2.

A first inter-layer insulation layer ILD1 may be disposed on the gate electrode GE.

A capacitor electrode CE may be positioned on the first inter-layer insulation layer ILD1. The capacitor electrode CE may be disposed using the second metal layer M2.

The capacitor electrode CE, together with the gate electrode GE of the first thin film transistor TFT1, may form a storage capacitor Cstg. The first thin film transistor TFT1 may be, e.g., the driving transistor DRT shown in FIG. 2.

A second inter-layer insulation layer ILD2 may be disposed on the capacitor electrode CE.

A source electrode SE may be positioned on the second inter-layer insulation layer ILD2. The source electrode SE may be electrically connected to the active layer ACT through a contact hole. The source electrode SE may be disposed using the third metal layer M3.

Several signal lines may be disposed using the third metal layer M3.

For example, the data line DL for supplying the data voltage Vdata may be disposed using the third metal layer M3. The first power line VDL for supplying the first driving voltage VDD may be disposed using the third metal layer M3.

A portion of the first power line VDL may be positioned in the active area AA. In some cases, the first power line VDL may be positioned in the non-active area NA.

The data line DL, the first power line VDL, and the second power line VSL may be disposed in various ways by using at least a portion of several metal layers.

FIG. 4 illustrates an example in which the data line DL and the first power line VDL are disposed using the third metal layer M3, but the data line DL and the first power line VDL may be disposed using the metal layer M1 or the second metal layer M2.

Further, as in the example shown in FIG. 4, the first power line VDL may include a portion formed of the third metal layer M3 and a portion formed of the fourth metal layer M4. Accordingly, the resistance of the first power line VDL may be reduced.

A third inter-layer insulation layer ILD3 may be disposed on the third metal layer M3.

A first planarization layer PAC1 may be disposed on the third inter-layer insulation layer ILD3. The first planarization layer PAC1 may be formed of, e.g., an organic material.

A fourth metal layer M4 may be positioned on the first planarization layer PAC1.

A portion of the first power line VDL may be disposed using the fourth metal layer M4.

A first electrode connection pattern ACP may be disposed using the fourth metal layer M4. The second thin film transistor TFT2 and the light emitting element ED may be electrically connected by the first electrode connection pattern ACP. The second thin film transistor TFT2 may be, e.g., the fourth transistor T4 or the fifth transistor T5 shown in FIG. 2.

A second planarization layer PAC2 may be disposed on the fourth metal layer M4. The second planarization layer PAC2 may be formed of, e.g., an organic material.

A light emitting element ED may be disposed on the second planarization layer PAC2.

The first electrode layer E1 of the light emitting element ED may be positioned on the second planarization layer PAC2.

A bank layer BNK may be disposed on the second planarization layer PAC2 while exposing a portion of the first electrode layer E1.

A light emitting layer EL may be positioned on the first electrode layer E1. The light emitting layer EL may be positioned on a portion of the bank layer BNK.

A second electrode layer E2 may be positioned on the light emitting layer EL and the bank layer BNK.

An emission area EA may be determined by the bank layer BNK.

An encapsulation layer ENCAP may be disposed on the light emitting element ED. The encapsulation layer ENCAP may be formed of a single layer or multiple layers. For example, the encapsulation layer ENCAP may include a first inorganic layer, an organic layer, and a second inorganic layer.

A touch sensor structure may be disposed on the encapsulation layer ENCAP.

For example, the touch buffer layer TBUF may be positioned on the encapsulation layer ENCAP. The touch buffer layer TBUF may be formed of, e.g., an inorganic material. In some cases, the touch buffer layer TBUF may not be disposed. In this case, the electrode included in the touch sensor structure may be directly disposed on the encapsulation layer ENCAP.

A touch electrode connection pattern CL may be positioned on the touch buffer layer TBUF.

A touch insulation layer TILD may be positioned on the touch electrode connection pattern CL. The touch insulation layer TILD may be an organic material or an inorganic material. When the touch insulation layer TILD is an organic material, a layer formed of an inorganic material may be further disposed between the touch insulation layer TILD and the touch electrode connection pattern CL.

The touch electrode TE may be positioned on the touch insulation layer TILD.

A touch protection layer TPAC may be disposed on the touch electrode TE. The touch protection layer TPAC may be an organic material or an inorganic material.

Since the touch electrode TE and the touch electrode connection pattern CL are disposed using a plurality of layers, it is possible to easily implement the touch sensor structure that include the X-touch electrode line X-TEL and the Y-touch electrode line Y-TEL.

The touch electrode TE and the touch electrode connection pattern CL may be disposed while avoiding the emission area EA. The touch electrode TE and the touch electrode connection pattern CL may overlap the non-emission area NEA.

Since the touch electrode TE and the touch electrode connection pattern CL are disposed on the encapsulation layer ENCAP while avoiding the emission area EA, the touch sensor structure may be included in the display panel 110 without affecting the image display function of the display panel 110.

Although not shown in FIG. 4, a color filter layer may be positioned above or under the touch sensor structure.

For example, a color filter layer may be disposed on the touch protection layer TPAC. Alternatively, at least one insulation layer may be disposed on the touch protection layer TPAC, and a color filter layer may be disposed on the at least one insulation layer. The touch protection layer TPAC or at least one insulation layer positioned between the touch sensor structure and the color filter layer may be formed of an organic material or an inorganic material.

The color filter layer may include a color filter and a black matrix. For example, the color filter may be positioned in an area corresponding to the emission area EA. For example, the black matrix may be positioned in an area corresponding to a non-emission area NEA. The black matrix may be positioned to correspond to the touch sensor structure.

Alternatively, the color filter layer may be positioned between the encapsulation layer ENCAP and the touch sensor structure.

For example, the color filter layer may be positioned on the encapsulation layer ENCAP. At least one insulation layer formed of an organic material or an inorganic material may be positioned between the color filter layer and the encapsulation layer ENCAP.

The color filter layer may include a color filter disposed to correspond to the emission area EA and a black matrix disposed to correspond to the non-emission area NEA.

At least one insulation layer may be disposed on the color filter layer, and a touch sensor structure may be disposed on at least one insulation layer. The top surface of at least one insulation layer positioned between the color filter layer and the touch sensor structure may be planarized. The touch sensor structure may be positioned to correspond to the black matrix included in the color filter layer.

Further, although not shown in FIG. 4, a touch routing line TL connected to the touch electrode TE may be disposed along an inclined surface of the encapsulation layer ENCAP. The touch routing line TL may be positioned on the same layer as the touch electrode TE and may be positioned on the same layer as the touch electrode connection pattern CL. Alternatively, the touch routing line TL may be disposed using the two layers. The touch routing line TL may be electrically connected to the pad positioned in the non-active area NA.

In a structure in which a plurality of X-touch electrode lines X-TEL and a plurality of Y-touch electrode lines Y-TEL are disposed to cross each other, the touch driving circuit 150 may perform touch sensing while driving the touch electrode line TEL through the touch routing line TL.

For example, either the X-touch electrode line X-TEL or the Y-touch electrode line Y-TEL may be a touch driving electrode to which a touch driving signal is applied. The other of the X-touch electrode line X-TEL and the Y-touch electrode line Y-TEL may be a touch sensing electrode from which a touch sensing signal is detected.

The touch driving circuit 150 may detect a change in mutual capacitance that occurs when the user touches in a state in which different signals are applied to the X-touch electrode line X-TEL and the Y-touch electrode line Y-TEL.

The touch driving circuit 150 may transfer sensing data according to the detected change in mutual capacitance to the touch controller. The touch controller may detect whether a touch to the display panel 110 has occurred and touch coordinates based on the sensing data received from the touch driving circuit 150.

The touch electrode lines TEL disposed on the display panel 110 may be divided and disposed in multiple areas in the active area AA.

Since the touch electrode line TEL is divided and disposed for each area, the load of the touch electrode line TEL may be reduced. When the area of the display panel 110 increases, it is possible to reduce the load of the touch electrode line TEL while enhancing touch sensing performance.

As such, the touch driving circuit 150 may drive the touch electrode line TEL disposed on the encapsulation layer ENCAP, sensing the user's contacting touch. Further, aspects of the disclosure may also detect a position or motion in a state without touch by, e.g., the user's finger, using the touch electrode line TEL disposed on the encapsulation layer ENCAP.

Figure 5:
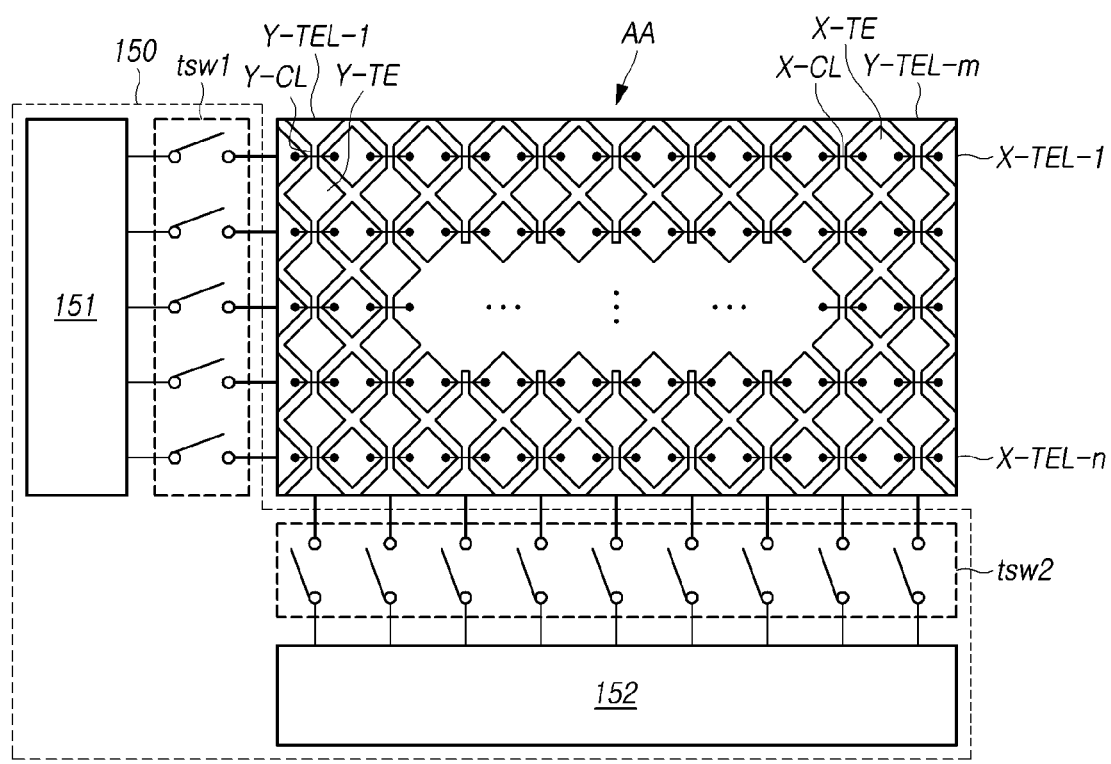
FIG. 5 is a view illustrating an example of a structure of a touch driving circuit driving a touch electrode line in a touch display device according to aspects of the present disclosure.

FIG. 5 is a view illustrating an example of a structure of a touch driving circuit 150 driving a touch electrode line TEL in a touch display device 100 according to aspects of the disclosure.

Referring to FIG. 5, a plurality of touch electrode lines TEL may be disposed in the active area AA of the display panel 110. FIG. 5 illustrates an example where n X-touch electrode lines X-TEL and m Y-touch electrode lines Y-TEL are disposed in the active area AA.

Each of the n X-touch electrode lines X-TEL may include at least one X-touch electrode connection pattern X-CL electrically connecting two or more X-touch electrodes X-TE and X-touch electrodes X-TE. m Y-touch electrode lines Y-TEL may include at least one Y-touch electrode connection pattern Y-CL connecting two or more Y-touch electrodes Y-TE and Y-touch electrodes Y-TE.

The n X-touch electrode lines X-TEL and the m Y-touch electrode lines Y-TEL may be driven by the touch driving circuit 150.

A touch driving circuit 150 may include, e.g., a first touch driving unit 151 and a second touch driving unit 152.

The first touch driving unit 151 may drive n X-touch electrode lines X-TEL. For example, the first touch driving unit 151 may be electrically connected to each of the n X-touch electrode lines X-TEL through the first touch switch tsw1.

The first touch driving unit 151 may supply a signal to the X-touch electrode line X-TEL or float the X-touch electrode line X-TEL according to the operating state of the first touch switch tsw1.

The second touch driving unit 152 may drive m Y-touch electrode lines Y-TEL. For example, the second touch driving unit 152 may be electrically connected to each of the m Y-touch electrode lines Y-TEL through the second touch switch tsw2.

The second touch driving unit 152 may supply a signal to the Y-touch electrode line Y-TEL or float the Y-touch electrode line Y-TEL according to the operating state of the second touch switch tsw2.

The first touch driving unit 151 may drive n X-touch electrode lines X-TEL as touch driving electrodes or touch sensing electrodes during the touch driving period.

The second touch driving unit 152 may drive m Y-touch electrode lines Y-TEL as touch sensing electrodes or as touch driving electrodes during the touch driving period.

Alternatively, the first touch driving unit 151 may drive some of the n X-touch electrode lines X-TEL as touch driving electrodes and drive others as touch sensing electrodes during the touch driving period.

The second touch driving unit 152 may drive some of the m Y-touch electrode lines Y-TEL as touch driving electrodes and drive others as touch sensing electrodes during the touch driving period.

Various types of touch sensing may be performed in various schemes in which the first touch driving unit 151 and the second touch driving unit 152 drive a plurality of touch electrode lines TEL.

Figure 6:
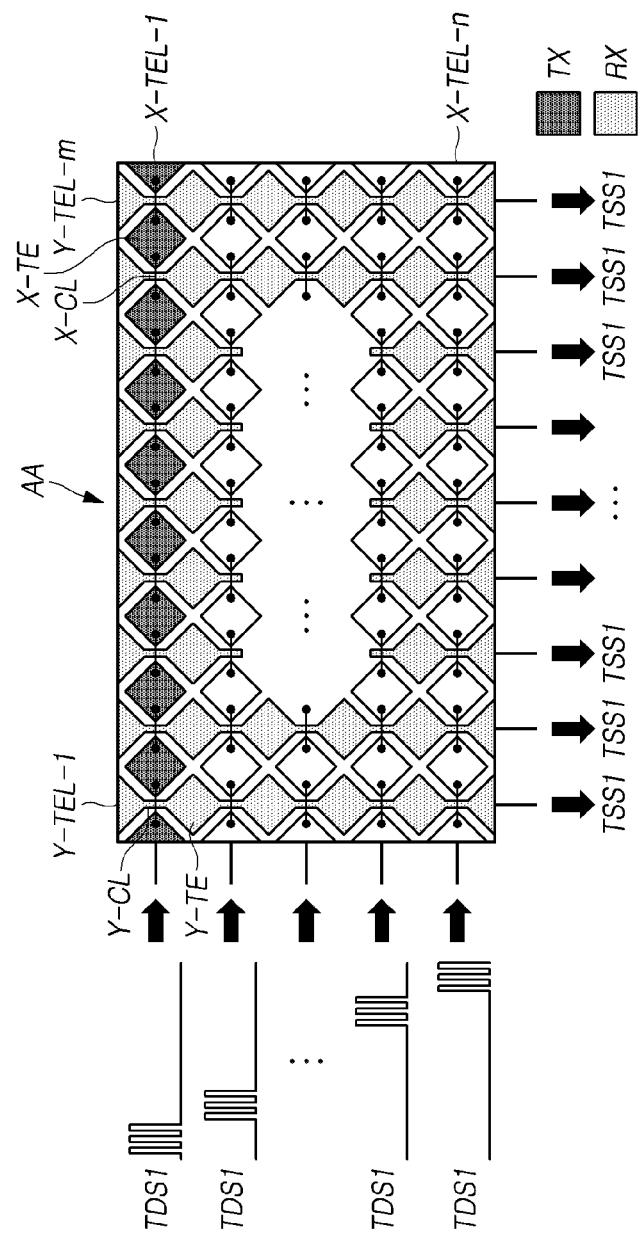
FIG. 6 is a view illustrating an example of a driving scheme in a first touch driving period by a touch display device according to aspects of the present disclosure.
Figure 7:
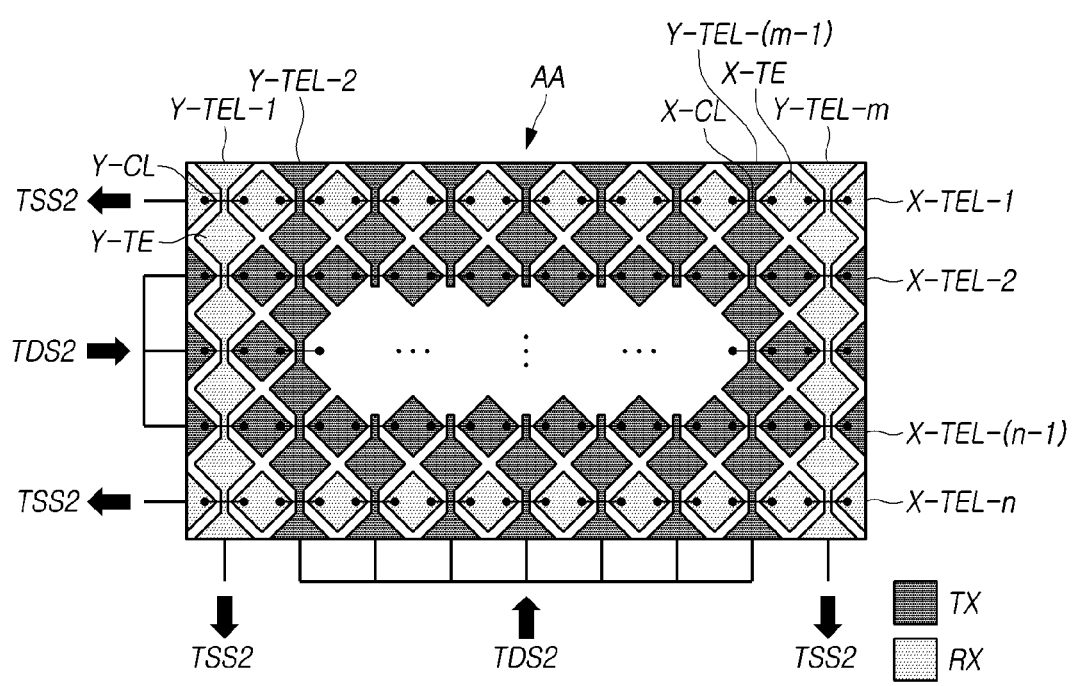
FIG. 7 is a view illustrating an example of a driving scheme in a second touch driving period by a touch display device according to aspects of the present disclosure.
Figure 8:
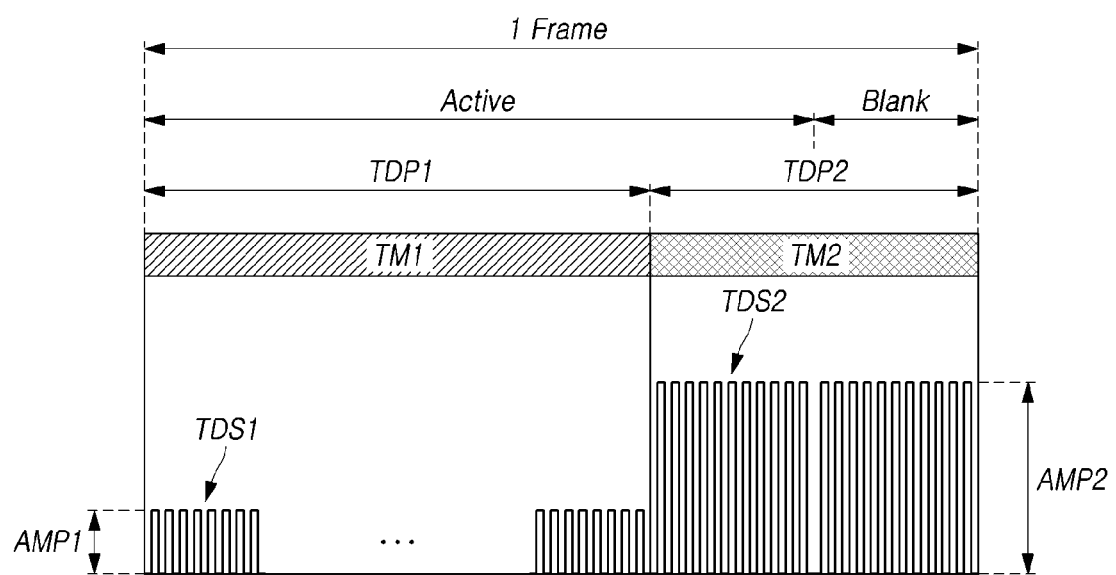
FIG. 8 is a view illustrating an example of a touch driving signal output to a touch electrode line in a first touch driving period and a second touch driving period by a touch driving circuit according to aspects of the present disclosure.

FIG. 6 is a view illustrating an example of a driving scheme in a first touch driving period TDP1 by a touch display device 100 according to aspects of the disclosure. FIG. 7 is a view illustrating an example of a driving scheme in a second touch driving period TDP2 by a touch display device 100 according to aspects of the disclosure. FIG. 8 is a view illustrating an example of a touch driving signal TDS output to a touch electrode line TEL in a first touch driving period TDP1 and a second touch driving period TDP2 by a touch driving circuit 150 according to aspects of the disclosure.

Referring to FIGS. 6 and 8, the touch driving circuit 150 may drive the plurality of touch electrode lines TEL disposed in the active area AA in different schemes in temporally divided periods.

For example, the touch driving circuit 150 may drive the plurality of touch electrode lines TEL according to a first touch mode TM1 in the first touch driving period TDP1. The first touch mode TM1 may be a mode for sensing the user's contact-based touch on the display panel 110. In the disclosure, the first touch driving period TDP1 may be referred to as a contacting touch driving period.

For example, the touch driving circuit 150 may supply the first touch driving signal TDS1 to n X-touch electrode lines X-TEL. In the disclosure, the first touch driving signal TDS1 may be referred to as a contacting touch driving signal.

The first touch driving signal TDS1 may be sequentially supplied to n X-touch electrode lines X-TEL by the first touch driving unit 151. The n X-touch electrode lines X-TEL may operate as touch driving electrodes TX.

For example, the touch driving circuit 150 may supply a constant voltage to m Y-touch electrode lines Y-TEL. A constant voltage may be simultaneously supplied to at least two of the m Y-touch electrode lines Y-TEL by the second touch driving unit 152.

The touch driving circuit 150 may detect a first touch sensing signal TSS1 from the Y-touch electrode line Y-TEL while a first touch driving signal TDS1 is supplied to the X-touch electrode line X-TEL and a constant voltage is supplied to the Y-touch electrode line Y-TEL. The m number of Y-touch electrode lines Y-TEL may operate as touch sensing electrodes RX.

The touch driving circuit 150 may detect a change in capacitance caused by the user's touch, sensing whether the user's touch is present and the position of touch.

The touch driving circuit 150 may differently drive the n X-touch electrode lines X-TEL and the m Y-touch electrode lines Y-TEL while detecting the position or motion over the display panel 110 in a state without, e.g., a touch by the user's finger.

Referring to FIGS. 7 and 8, the touch driving circuit 150 may drive the plurality of touch electrode lines TEL according to a second touch mode TM1 in the second touch driving period TDP2. The second touch mode TM2 may be a mode for detecting a position or motion of, e.g., the user's finger in a state in which the user's finger does not contact the display panel 110. In the disclosure, the second touch driving period TDP2 may be referred to as a contactless touch driving period or a hover touch driving period.

The touch driving circuit 150 may supply the second touch driving signal TDS2 to the first group of n X-touch electrode lines X-TEL in the second touch driving period TDP2. The first group of n X-touch electrode lines X-TEL may include, e.g., the second X-touch electrode line X-TEL-2 through the (n−1)th X-touch electrode line X-TEL-(n−1).

In the disclosure, the second touch driving signal TDS2 may be referred to as a contactless touch driving signal or a hover touch driving signal.

The second touch driving signal TDS2 may be simultaneously supplied to the first group of n X-touch electrode lines X-TEL. Alternatively, in some cases, the second touch driving signal TDS2 may be sequentially supplied to n X-touch electrode lines X-TEL.

The scheme for supplying the second touch driving signal TDS2 may be controlled according to the operation of the first touch switch tsw1 electrically connected to the first touch driving unit 151.

The touch driving circuit 150 may supply a constant voltage to a second group of n X-touch electrode lines X-TEL in the second touch driving period TDP2. The second group of n X-touch electrode lines X-TEL may include, e.g., the first X-touch electrode line X-TEL-1 through the nth X-touch electrode line X-TEL-n. The second group of n X-touch electrode lines X-TEL may be positioned at the edge of the active area AA.

The touch driving circuit 150 may detect the second touch sensing signal TSS2 from the second group of n X-touch electrode lines X-TEL.

By the first touch driving unit 151, the first group of n X-touch electrode lines X-TEL may operate as touch driving electrodes TX, and the second group of n X-touch electrode lines X-TEL may operate as touch sensing electrodes RX.

The number or area of the X-touch electrode lines X-TEL included in the first group of n X-touch electrode lines X-TEL may be larger than the number or area of the X-touch electrode lines X-TEL included in the second group of n X-touch electrode lines X-TEL.

The touch driving circuit 150 may supply the second touch driving signal TDS2 to the first group of m Y-touch electrode lines Y-TEL in the second touch driving period TDP2. The first group of m Y-touch electrode lines Y-TEL may include, e.g., the second Y-touch electrode line Y-TEL-2 through the (m−1)th Y-touch electrode line Y-TEL-(m−1).

The second touch driving signal TDS2 may be simultaneously supplied to the first group of m Y-touch electrode lines Y-TEL.

The touch driving circuit 150 may supply a constant voltage to a second group of m Y-touch electrode lines Y-TEL in the second touch driving period TDP2. The second group of m Y-touch electrode lines Y-TEL may include, e.g., the first Y-touch electrode line Y-TEL-1 through the mth Y-touch electrode line Y-TEL-m. The second group of m Y-touch electrode lines Y-TEL may be positioned at the edge of the active area AA.

The touch driving circuit 150 may detect the second touch sensing signal TSS2 from the second group of m Y-touch electrode lines Y-TEL.

By the second touch driving unit 152, the first group of m Y-touch electrode lines Y-TEL may operate as touch driving electrodes TX, and the second group of m Y-touch electrode lines Y-TEL may operate as touch sensing electrodes RX.

The number or area of the Y-touch electrode lines Y-TEL included in the first group of m Y-touch electrode lines Y-TEL may be larger than the number or area of the Y-touch electrode lines Y-TEL included in the second group of m Y-touch electrode lines Y-TEL.

In the second touch driving period TDP2, the second touch driving signal TDS2 may be applied to the first group of n X-touch electrode lines X-TEL and the first group of m Y-touch electrode lines Y-TEL. In the second touch driving period TDP2, a constant voltage may be applied to the second group of n X-touch electrode lines X-TEL and the second group of m Y-touch electrode lines Y-TEL.

Since some of the X-touch electrode lines X-TEL and Y-touch electrode lines Y-TEL operate as the touch driving electrodes TX and the touch sensing electrodes RX, the touch driving electrodes TX and the touch sensing electrodes RX may be positioned adjacently or alternately.

For example, at least one Y-touch electrode Y-TE included in the second group of Y-touch electrode lines Y-TEL may be positioned between two X-touch electrodes X-TE included in the first group of X-touch electrode lines X-TEL. Further, at least one other Y-touch electrode Y-TE included in the second group of Y-touch electrode lines Y-TEL may be positioned between two X-touch electrodes X-TE included in the second group of X-touch electrode lines X-TEL.

In the structure in which the touch driving electrodes TX and the touch sensing electrodes RX are mixed and positioned in the active area AA, an electric field may be formed between the touch electrode line TEL included in the first group and the touch electrode line TEL included in the second group.

Since the touch electrode lines TEL to which the second touch driving signal TDS2 is applied are positioned in a larger area of the center of the active area AA, and the touch electrode lines TEL to which the constant voltage is applied are positioned at the edge of the active area AA, the electric field formed between the touch electrode line TEL to which the second touch driving signal TDS2 is applied and the touch electrode line TEL to which the constant voltage is applied may be formed up to a higher position from the display panel 110.

A change in the electric field caused by the user's finger or the like positioned away from the display panel 110 may be detected. Thus, the position or motion of the user's finger or the like positioned over the display panel 110 may be detected.

For example, when the magnitude of the second touch sensing signal TSS2 detected from the first X-touch electrode line X-TEL-1 is large, the touch driving circuit 150 may recognize that the user's finger or the like is positioned adjacent to the upper side of the active area AA in the display panel.

The touch driving circuit 150 may recognize that the user's finger or the like is positioned adjacent to the lower, left, and right sides of the active area AA according to the second touch sensing signal TSS2 detected from the nth X-touch electrode line X-TEL-n, the first Y-touch electrode line Y-TEL-1, and the mth Y-touch electrode line Y-TEL-m.

Further, in some cases, the touch driving circuit 150 may drive the touch electrode line TEL positioned inside the edge of the active area AA as the touch sensing electrode RX.

For example, the touch driving circuit 150 may drive the second X-touch electrode line X-TEL-2, the (n−1)th X-touch electrode line X-TEL-(n−1), the second Y-touch electrode line Y-TEL-2, and the (m−1)th Y-touch electrode line Y-TEL-(m−1) as the touch sensing electrodes RX. The touch driving circuit 150 may drive the remaining touch electrode lines TEL as touch driving electrodes TX.

It is possible to increase the sensing performance of contactless touch at the edge of the active area AA while maintaining the number or area of touch electrode lines TEL to which the second touch driving signal TDS2 is supplied.

As such, the touch driving circuit 150 may drive the first group of touch electrode lines TEL occupying a larger area in the active area AA as touch driving electrodes TX and drive the second group of touch electrode lines TEL positioned in the edge of the active area AA as touch sensing electrodes RX, detecting the position or motion of the user's finger or the like, which does not contact the display panel 110, using the touch sensor structure which senses contacting touch.

The touch driving circuit 150 may supply the second touch driving signal TDS2 differently from the first touch driving signal TDS1 to detect the user's contactless touch.

As an example, referring to FIG. 8, the touch driving circuit 150 may supply the first touch driving signal TDS1 in the first touch driving period TDP1 and supply the second touch driving signal TDS2 in the second touch driving period TDP2.

The first touch driving signal TDS1 may have a first amplitude AMP1. The second touch driving signal TDS2 may have a second amplitude AMP2. The second amplitude AMP2 may be larger than the first amplitude AMP1.

It is possible to increase the magnitude of the electric field formed between the first group and second group of touch electrode lines TEL by increasing the amplitude of the second touch driving signal TDS2 supplied to the first group of touch electrode lines TEL in the second touch driving period TDP2. Performance of sensing contactless touch may be enhanced.

When the amplitude of the first touch driving signal TDS1 differs from the amplitude of the second touch driving signal TDS2, sensing of contacting touch and contactless touch may be performed while the touch driving electrode TX and the touch sensing electrode RX remain the same in the first touch driving period TDP1 and the second touch driving period TDP2.

As an example, the first touch driving signal TDS1 may be supplied to the n X-touch electrode lines X-TEL in the first touch driving period TDP1, and the first touch sensing signal TSS1 may be detected from the m Y-touch electrode lines Y-TEL. The second touch driving signal TDS2 having a larger amplitude than the amplitude of the first touch driving signal TDS1 may be supplied to the n X-touch electrode lines X-TEL in the second touch driving period TDP2, and the second touch sensing signal TSS2 may be detected from the m Y-touch electrode lines Y-TEL.

Or, the second amplitude AMP2 of the second touch driving signal TDS2 may be larger than the first amplitude AMP1 of the first touch driving signal TDS1.

By making the first touch driving period TDP1 and the second touch driving period TDP2 different from each other in a state in which the second amplitude AMP2 of the second touch driving signal TDS2 is the same as the first amplitude AMP1 of the first touch driving signal TDS1, contacting touch and contactless touch may be sensed.

In such a case, the second touch driving signal TDS2 may be the same signal as the first touch driving signal TDS1.

Or, the second amplitude AMP2 of the second touch driving signal TDS2 may be the same as the first amplitude AMP1 of the first touch driving signal TDS1, and at least one of the period or frequency of the second touch driving signal TDS2 may be different from at least one of the period or frequency of the first touch driving signal TDS1.

Further, the touch driving circuit 150 may supply the second touch driving signal TDS2 during the blank period of the frame period.

As an example, at least a portion of the second touch driving period TDP2 when the second touch driving signal TDS2 is supplied to the touch electrode lines TEL may overlap with the blank period of the frame period. Or, the entire second touch driving period TDP2 may be included in the blank period of the frame period.

The blank period may be a period when the scan signal is not supplied to the gate line GL, or the data voltage Vdata is not supplied to the data line DL.

Since the second touch driving signal TDS2 having an amplitude larger than that of the first touch driving signal TDS1 is supplied to the touch electrode lines TEL during the blank period of the frame period, it is possible to prevent noise from occurring in display driving by the second touch driving signal TDS2.

In some cases, the blank period of the frame period may overlap with the period when a signal for sensing touch by a pen is supplied. In this case, at least a portion of the second touch driving period TDP2 may overlap with the active period of the frame period.

FIG. 8 illustrates an example in which the first touch driving period TDP1 and the second touch driving period TDP2 are included in one frame period. However, the first touch driving period TDP1 and the second touch driving period TDP2 may be alternate every frame, or may be included in the frame period according to a different driving frequency.

As in the above-described example, the touch driving circuit 150 may sense contactless touch using the touch sensor structure for sensing contacting touch and may drive the touch electrode lines TEL in the second touch mode TM2 in various manners to increase the sensing performance of contactless touch.

FIGS. 9 to 12 are views illustrating other examples of a driving scheme in a second touch driving period TDP2 by a touch display device 100 according to aspects of the disclosure.

Figure 9:
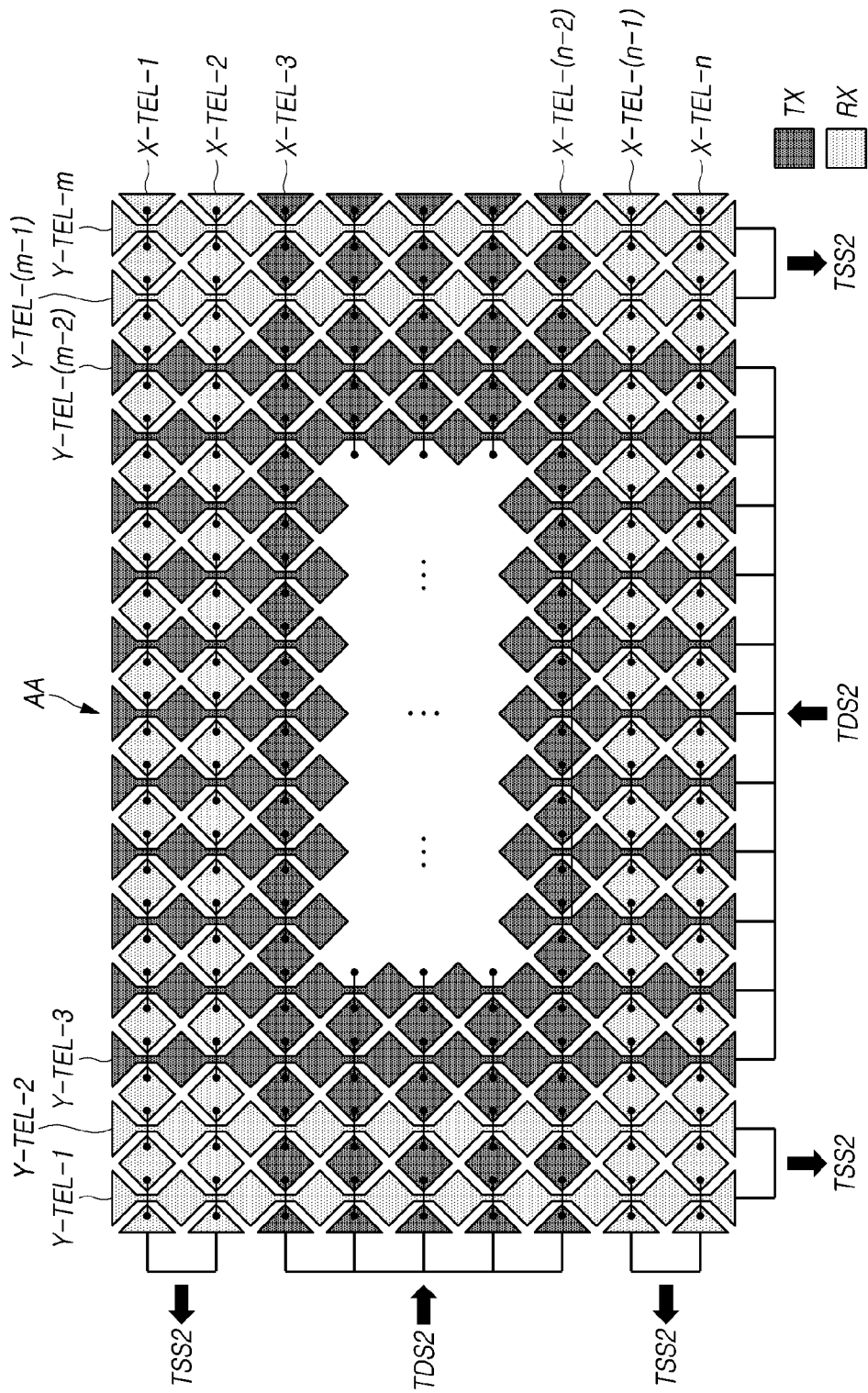
FIGS. 9, 10, 11, and 12 are views illustrating other examples of a driving scheme in a second touch driving period by a touch display device according to aspects of the present disclosure.

Referring to FIG. 9, the touch driving circuit 150 may supply the second touch driving signal TDS2 to the third X-touch electrode line X-TEL-3 to the (n−2)th X-touch electrode line X-TEL-(n−2) included in the first group among the n X-touch electrode lines X-TEL in the second touch driving period TDP2.

The touch driving circuit 150 may supply the second touch driving signal TDS2 to the third Y-touch electrode line Y-TEL-3 to the (m−2)th Y-touch electrode line Y-TEL-(m−2) included in the first group among the m Y-touch electrode lines Y-TEL in the second touch driving period TDP2.

The touch driving circuit 150 may receive the second touch sensing signal TSS2 from the first X-touch electrode line X-TEL-1, the second X-touch electrode line X-TEL-2, the (n−1)th X-touch electrode line X-TEL-(n−1), and the nth X-touch electrode line X-TEL-n included in the second group among the n X-touch electrode lines X-TEL in the second touch driving period TDP2.

The touch driving circuit 150 may receive the second touch sensing signal TSS2 from the first Y-touch electrode line Y-TEL-1, the second Y-touch electrode line Y-TEL-2, the (m−1)th Y-touch electrode line Y-TEL-(m−1), and the mth Y-touch electrode line Y-TEL-m included in the second group among the m Y-touch electrode lines Y-TEL in the second touch driving period TDP2.

The touch driving circuit 150 may drive two or more touch electrode lines TEL, positioned at each edge of the active area AA, as the touch sensing electrodes RX.

The touch driving circuit 150 senses contactless touch using the second touch sensing signal TSS2 received from two or more touch electrode lines TEL positioned at each edge in the second touch driving period TDP2 for sensing contactless touch, so that accuracy of contactless touch sensing may be enhanced.

Or, the touch driving circuit 150 may drive at least one touch electrode line TEL, positioned in the center area of the active area AA, as the touch sensing electrode RX in the second touch driving period TDP2 to increase the accuracy of contactless touch sensing.

Figure 10:
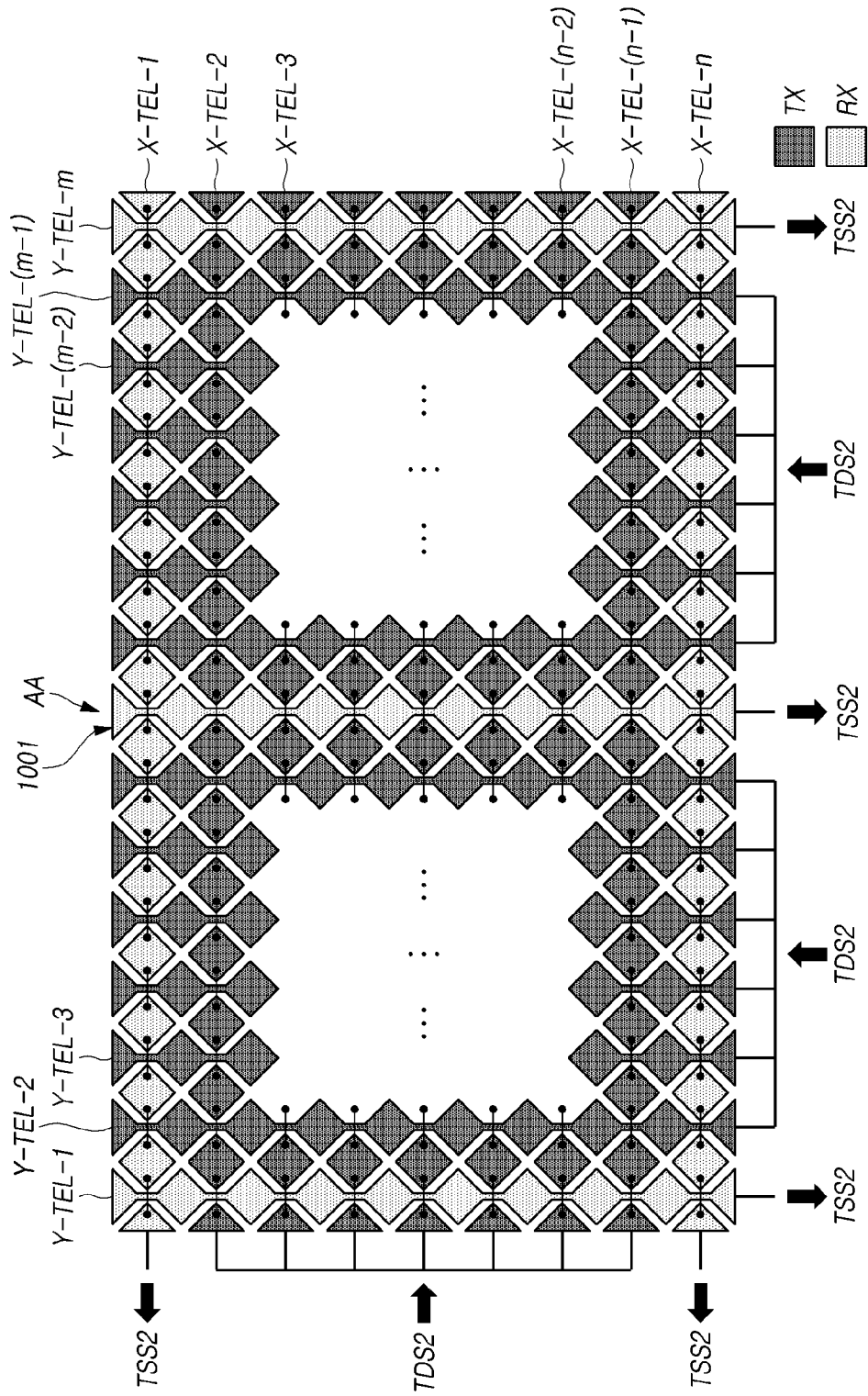

Referring to FIG. 10, the touch driving circuit 150 may supply the second touch driving signal TDS2 to the second X-touch electrode line X-TEL-2 to the (n−1)th X-touch electrode line X-TEL-(n−1) included in the first group of the n X-touch electrode lines X-TEL in the second touch driving period TDP2.

The touch driving circuit 150 may receive the second touch sensing signal TSS2 from the first X-touch electrode line X-TEL-1 and the nth X-touch electrode line X-TEL-n included in the second group among the n X-touch electrode lines X-TEL in the second touch driving period TDP2.

The touch driving circuit 150 may drive the first group of m Y-touch electrode lines Y-TEL as touch driving electrodes TXs and the second group as touch sensing electrodes RX in the second touch driving period TDP2.

At least one Y-touch electrode lines Y-TEL included in the second group of m Y-touch electrode lines Y-TEL may be positioned between two Y-touch electrode lines Y-TEL included in the first group of m Y-touch electrode lines Y-TEL.

As an example, as the Y-touch electrode line Y-TEL indicated by 1001, the Y-touch electrode line Y-TEL positioned in the center of the active area AA among the m Y-touch electrode lines Y-TEL may be driven as a touch sensing electrode RX.

The touch driving circuit 150 may receive the second touch sensing signal TSS2 from the first Y-touch electrode line Y-TEL-1 positioned on the left side of the active area AA, the mth Y-touch electrode line Y-TEL-m positioned on the right side of the active area AA, and the Y-touch electrode line Y-TEL positioned in the center of the active area AA and sense contactless touch on the display panel 110.

Since the touch driving circuit 150 senses contactless touch using the Y-touch electrode line Y-TEL positioned at the edge of the active area AA and the Y-touch electrode line Y-TEL positioned in the center, accuracy of sensing of the position of contactless touch may be increased.

Further, similarly, the touch driving circuit 150 may drive at least one X-touch electrode line X-TEL positioned in the center of the active area AA as a touch sensing electrode RX, increasing the sensing accuracy of contactless touch.

Further, the touch driving circuit 150 may drive at least one X-touch electrode line X-TEL and at least one Y-touch electrode line Y-TEL positioned in the center of the active area AA as touch sensing electrodes RX.

Figure 11:
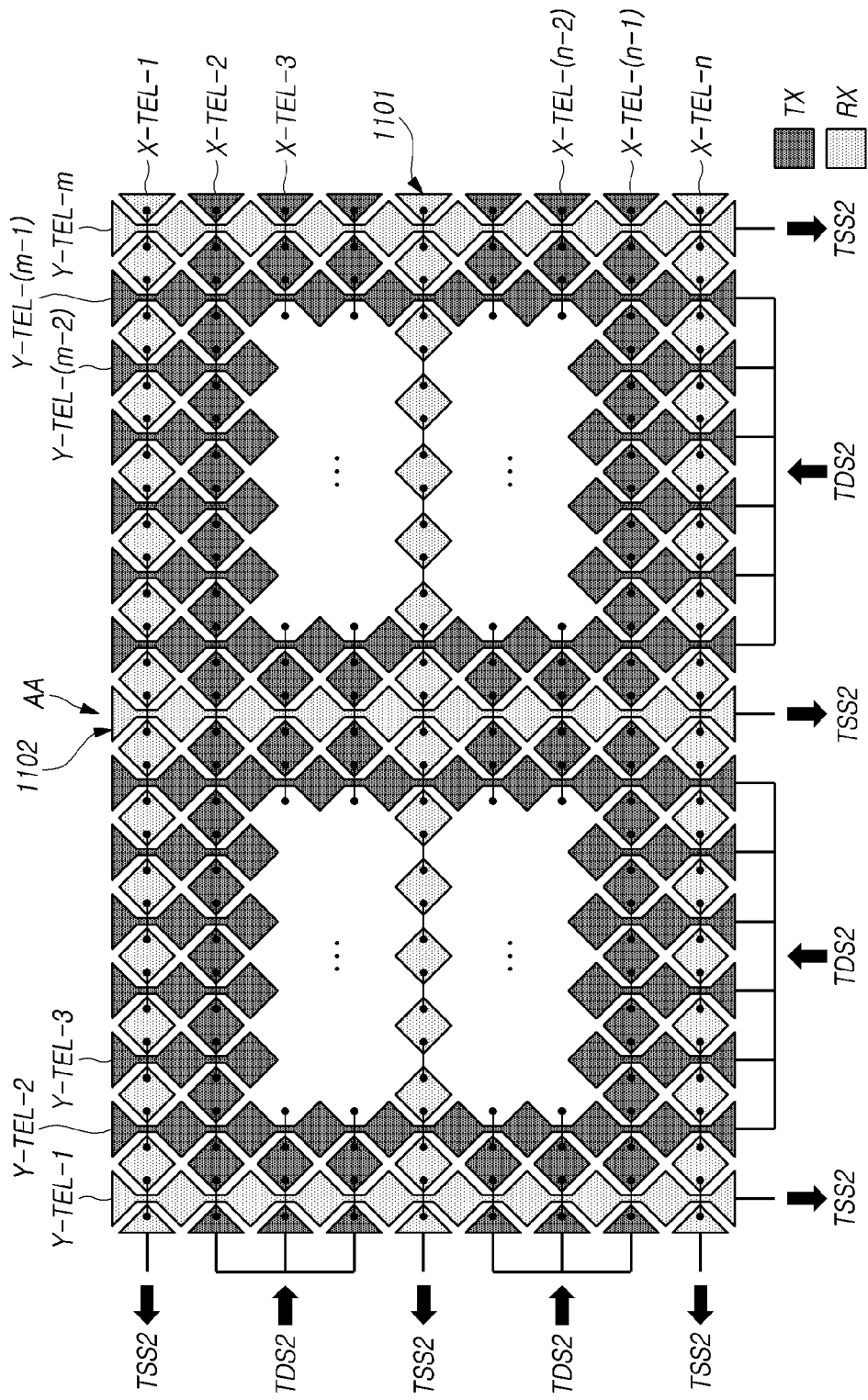

As an example, referring to FIG. 11, the touch driving circuit 150 may supply the touch electrode lines TEL included in the second touch driving signal TDS2 to the first group of n X-touch electrode lines X-TEL and the first group of m Y-touch electrode lines Y-TEL in the second touch driving period TDP2.

The touch driving circuit 150 may drive the first X-touch electrode line X-TEL-1 and the nth X-touch electrode line X-TEL-n positioned at the edge of the active area AA among the n X-touch electrode lines X-TEL, as touch sensing electrodes RX. The touch driving circuit 150 may drive the X-touch electrode line X-TEL indicated by 1101, positioned in the center among the n X-touch electrode lines X-TEL, as a touch sensing electrode RX.

Further, the touch driving circuit 150 may drive the first Y-touch electrode line Y-TEL-1, the mth Y-touch electrode line Y-TEL-m, and the Y-touch electrode line Y-TEL indicated by 1102 among the m Y-touch electrode lines Y-TEL, as touch sensing electrodes RX.

The touch driving circuit 150 may receive the second touch sensing signal TSS2 from the touch electrode line TEL positioned at the edge of the active area AA and the touch electrode line TEL crossing the center of the active area AA in the contactless touch driving period.

Since the touch driving circuit 150 further receives the second touch sensing signal TSS2 from the touch electrode line TEL crossing the center of the active area AA and detects the position of contactless touch using the received second touch sensing signal TSS2, sensing accuracy of position of contactless touch may be enhanced.

Further, the touch driving circuit 150 may drive the touch electrode lines TEL to be able to adjust the height or distribution of the electric field formed between touch driving electrode TX and touch sensing electrode RX to increase the sensing performance of contactless touch.

Figure 12:
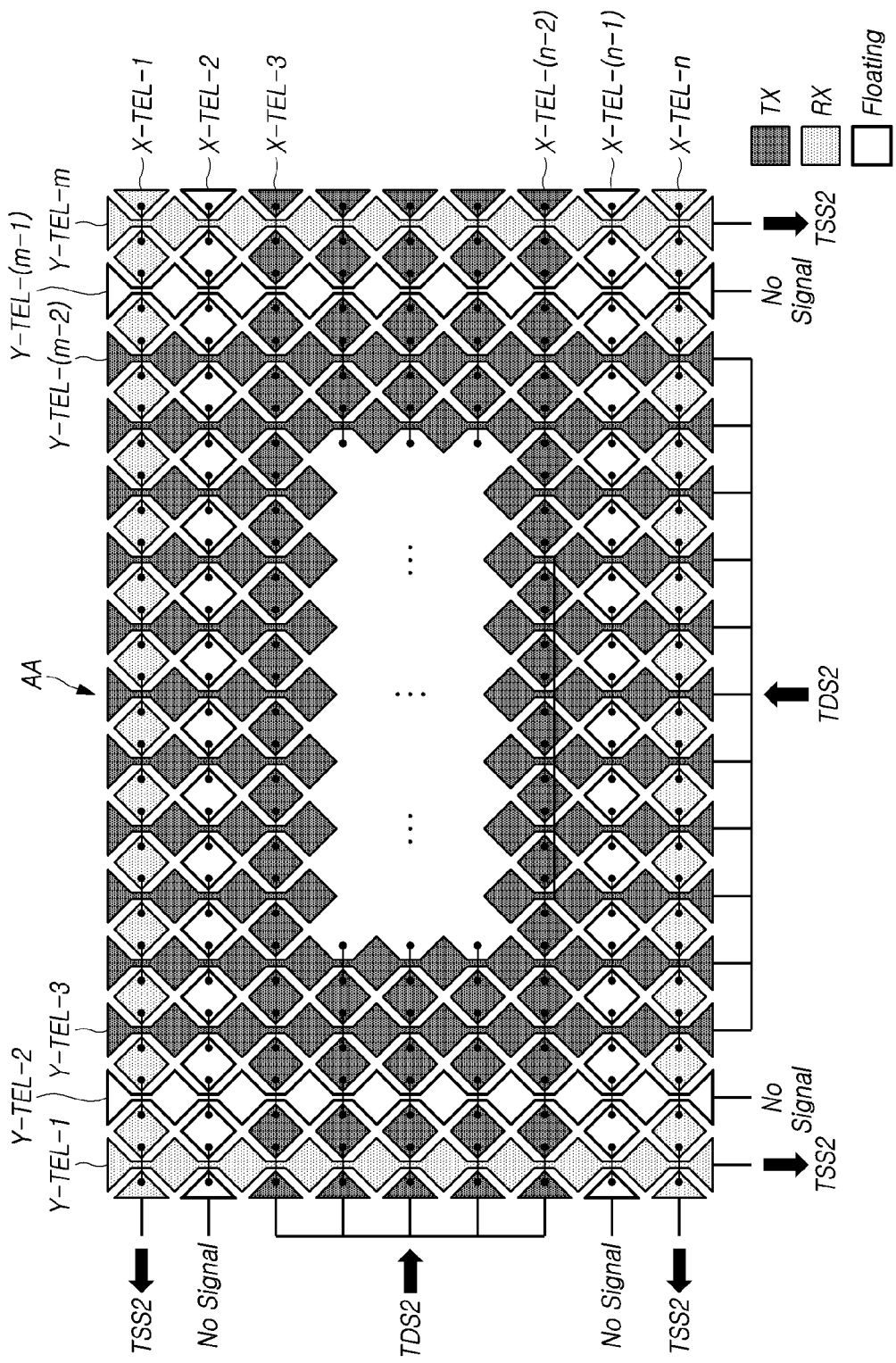

Referring to FIG. 12, the touch driving circuit 150 may supply the second touch driving signal TDS2 to the touch electrode lines TEL included in the first group of touch electrode lines TEL in the second touch driving period TDP2.

The first group of touch electrode lines TEL may include, e.g., a third X-touch electrode line X-TEL-3 to an (n−2)th X-touch electrode line X-TEL-(n−2), and a third Y-touch electrode line Y-TEL-3 to an (m−2)th Y-touch electrode line Y-TEL-(m−2).

The touch driving circuit 150 may supply a constant voltage to the touch electrode lines TEL included in the second group among the touch electrode lines TEL in the second touch driving period TDP2. The touch driving circuit 150 may receive the second touch sensing signal TSS2 from the touch electrode lines TEL included in the second group.

The second group of touch electrode lines TEL may include, e.g., a first X-touch electrode line X-TEL-1, an nth X-touch electrode line X-TEL-n, and a first Y-A touch electrode line Y-TEL-1 and an mth Y-touch electrode line Y-TEL-m.

The touch driving circuit 150 may float the touch electrode lines TEL included in the third group among the touch electrode lines TEL in the second touch driving period TDP2. The touch driving circuit 150 may not supply a signal to the touch electrode lines TEL included in the third group or may turn off the touch switch connected to the touch electrode lines TEL included in the third group.

For example, the third group of touch electrode lines TEL may be positioned between the first group and the second group of touch electrode lines TEL.

For example, the third group of touch electrode lines TEL may include, e.g., a second X-touch electrode line X-TEL-2, an (n−1)th X-touch electrode line X-TEL-(n−1), and a second Y-touch electrode line Y-TEL-2 to an (m−1)th Y-touch electrode line Y-TEL-(m−1).

Further, in some cases, the number of touch electrode lines TEL included in the third group positioned between the first group and the second group of touch electrode lines TEL may be two or more.

Since the third group of touch electrode lines TEL are positioned between the first group of touch electrode lines TEL operating as the touch driving electrodes TX and the second group of touch electrode lines TEL operating as the touch sensing electrodes RX, the distance between the touch driving electrode TX and the touch sensing electrode RX may be increased.

As the spacing between the touch driving electrode TX and the touch sensing electrode RX increases, the height of the electric field formed between the touch driving electrode TX and the touch sensing electrode RX may increase, or the amount or proportion of the electric fields formed in a relatively high position may increase.

Since the user's finger or the like positioned away from the display panel 110 may be detected, the contactless touch sensing performance may be enhanced during the second touch driving period TDP2.

The foregoing aspects are briefly described below.

A touch display device according to aspects of the disclosure may comprise a substrate, a plurality of light emitting elements disposed in an active area on the substrate, an encapsulation layer on the plurality of light emitting elements, a plurality of first touch electrode lines disposed on the encapsulation layer and including two or more first touch electrodes electrically connected along a first direction, and a plurality of second touch electrode lines disposed on the encapsulation layer and including two or more second touch electrodes electrically connected along a second direction crossing the first direction.

A first touch driving signal may be supplied to the plurality of first touch electrode lines in a first touch driving period, and a second touch driving signal different from the first touch driving signal may be supplied to a first group of the plurality of first touch electrode lines and a first group of the plurality of second touch electrode lines in a second touch driving period.

A constant voltage may be supplied to a second group of the plurality of first touch electrode lines and a second group of the plurality of second touch electrode lines in the second touch driving period.

The second group of the plurality of first touch electrode lines and the second group of the plurality of second touch electrode lines may be positioned at an edge of the active area.

The number or area of the first touch electrode lines included in the frame guide of the plurality of first touch electrode lines may be larger than the number or area of the first touch electrode lines included in the second group of the plurality of first touch electrode lines. The number or area of the second touch electrode lines included in the first group of the plurality of second touch electrode lines may be larger than the number or area of the second touch electrode lines included in the second group of the plurality of second touch electrode lines.

At least one first touch electrode line included in the second group of the plurality of first touch electrode lines may be positioned between two first touch electrode lines included in the first group of the plurality of first touch electrode lines.

At least one second touch electrode line included in the second group of the plurality of second touch electrode lines may be positioned between two second touch electrode lines included in the first group of the plurality of second touch electrode lines.

A third group of the plurality of first touch electrode lines and a third group of the plurality of second touch electrode lines may be in a floating state in the second touch driving period.

The third group of the plurality of first touch electrode lines may be positioned between the first group and second group of the plurality of first touch electrode lines. The third group of the plurality of second touch electrode lines may be positioned between the first group and second group of the plurality of second touch electrode lines.

At least one second touch electrode included in the second group of the plurality of second touch electrode lines may be positioned between two first touch electrodes included in the first group of the plurality of second touch electrode lines. At least one second touch electrode included in the second group of the plurality of second touch electrode lines may be positioned between two first touch electrodes included in the second group of the plurality of first touch electrode lines.

A constant voltage may be supplied to the plurality of second touch electrode lines in the first touch driving period.

The first touch driving signal may be sequentially supplied to the plurality of first touch electrode lines. The second touch driving signal may be simultaneously supplied to the first group of the plurality of first touch electrode lines and the first group of the plurality of second touch electrode lines.

An amplitude of the second touch driving signal may be larger than an amplitude of the first touch driving signal.

At least a portion of the second touch driving period may overlap with at least a portion of a blank period of a frame period.

A touch display device according to aspects of the disclosure may comprise a substrate, a plurality of first touch electrode lines positioned on the substrate and including two or more first touch electrodes electrically connected along a first direction, a plurality of second touch electrode lines positioned on the substrate and including two or more second touch electrodes electrically connected along a second direction crossing the first direction, and a touch driving circuit driving the plurality of first touch electrode lines and the plurality of second touch electrode lines.

The touch driving circuit may output a contactless touch driving signal to a first group of the plurality of first touch electrode lines and a first group of the plurality of second touch electrode lines and output a constant voltage to a second group of the plurality of first touch electrode lines and a second group of the plurality of second touch electrode lines in a contactless touch driving period.

The touch driving circuit may output a contacting touch driving signal having an amplitude smaller than an amplitude of the contactless touch driving signal to the plurality of first touch electrode lines and output a constant voltage to the plurality of second touch electrode lines in a contacting touch driving period distinguished from the contactless touch driving period.

An area of the first group of the plurality of first touch electrode lines and the first group of the plurality of second touch electrode lines supplied with the contactless touch driving signal in the contactless touch driving period may be larger than an area of the plurality of first touch electrode lines supplied with the contacting touch driving signal in the contacting touch driving period.

The touch driving circuit may float a third group of the plurality of first touch electrode lines and a third group of the plurality of second touch electrode lines in the contactless touch driving period. The third group of the plurality of first touch electrode lines may be positioned between the first group and second group of the plurality of first touch electrode lines. The third group of the plurality of second touch electrode lines may be positioned between the first group and second group of the plurality of second touch electrode lines.

A touch driving circuit according to aspects of the disclosure may comprise a first touch driving unit driving a plurality of first touch electrode lines including two or more first touch electrodes electrically connected along a first direction and a second touch driving unit driving a plurality of second touch electrode lines including two or more second touch electrodes electrically connected along a second direction crossing the first direction, wherein the first touch driving unit outputs a first touch driving signal to the plurality of first touch electrode lines in a first touch driving period and outputs a second touch driving signal different from the first touch driving signal to a first group of the plurality of first touch electrode lines and a constant voltage to a second group of the plurality of first touch electrode lines in a second touch driving period.

The second touch driving unit may output a constant voltage to the plurality of second touch electrode lines in the first touch driving period and output the second touch driving signal to a first group of the plurality of second touch electrode lines and a constant voltage to a second group of the plurality of second touch electrode lines in the second touch driving period.

The first touch driving unit may float at least one first touch electrode line positioned between the first group of the plurality of first touch electrode lines and the second group of the plurality of first touch electrode lines in the second touch driving period.

It will be apparent to those skilled in the art that various modifications and variations can be made in the touch driving circuit and the touch display device of the present disclosure without departing from the spirit or scope of the aspects. Thus, it is intended that the present disclosure covers the modifications and variations of the aspects provided they come within the scope of the appended claims and their equivalents.

What is claimed is:

1. A touch display device, comprising:
   a substrate;
   a plurality of light emitting elements disposed in an active area of the substrate;
   an encapsulation layer disposed on the plurality of light emitting elements;
   a plurality of first touch electrode lines disposed on the encapsulation layer and including two or more first touch electrodes electrically connected along a first direction; and
   a plurality of second touch electrode lines disposed on the encapsulation layer and including two or more second touch electrodes electrically connected along a second direction crossing the first direction,
   wherein a first touch driving signal is supplied to the plurality of first touch electrode lines in a first touch driving period, and
   wherein a second touch driving signal different from the first touch driving signal is supplied to a first group of the plurality of first touch electrode lines and a first group of the plurality of second touch electrode lines in a second touch driving period.

2. The touch display device of claim 1, wherein a constant voltage is supplied to a second group of the plurality of first touch electrode lines and a second group of the plurality of second touch electrode lines in the second touch driving period.

3. The touch display device of claim 2, wherein the second group of the plurality of first touch electrode lines and the second group of the plurality of second touch electrode lines are positioned at an edge of the active area.

4. The touch display device of claim 2, wherein the number or area of the first touch electrode lines included in the first group of the plurality of first touch electrode lines is larger than the number or area of the first touch electrode lines included in the second group of the plurality of first touch electrode lines, and wherein the number or area of the second touch electrode lines included in the first group of the plurality of second touch electrode lines is larger than the number or area of the second touch electrode lines included in the second group of the plurality of second touch electrode lines.

5. The touch display device of claim 2, wherein at least one first touch electrode line included in the second group of the plurality of first touch electrode lines is positioned between two first touch electrode lines included in the first group of the plurality of first touch electrode lines.

6. The touch display device of claim 2, wherein at least one second touch electrode line included in the second group of the plurality of second touch electrode lines is positioned between two second touch electrode lines included in the first group of the plurality of second touch electrode lines.

7. The touch display device of claim 2, wherein a third group of the plurality of first touch electrode lines and a third group of the plurality of second touch electrode lines are in a floating state in the second touch driving period.

8. The touch display device of claim 7, wherein the third group of the plurality of first touch electrode lines are positioned between the first group and second group of the plurality of first touch electrode lines, and the third group of the plurality of second touch electrode lines are positioned between the first group and second group of the plurality of second touch electrode lines.

9. The touch display device of claim 2, wherein at least one second touch electrode included in the second group of the plurality of second touch electrode lines is positioned between two first touch electrodes included in the first group of the plurality of second touch electrode lines, and
   wherein at least one second touch electrode included in the second group of the plurality of second touch electrode lines is positioned between two first touch electrodes included in the second group of the plurality of first touch electrode lines.

10. The touch display device of claim 1, wherein a constant voltage is supplied to the plurality of second touch electrode lines in the first touch driving period.

11. The touch display device of claim 1, wherein the first touch driving signal is sequentially supplied to the plurality of first touch electrode lines, and
    wherein the second touch driving signal is simultaneously supplied to the first group of the plurality of first touch electrode lines and the first group of the plurality of second touch electrode lines.

12. The touch display device of claim 1, wherein an amplitude of the second touch driving signal is larger than an amplitude of the first touch driving signal.

13. The touch display device of claim 1, wherein at least a portion of the second touch driving period overlaps with at least a portion of a blank period of a frame period.

14. A touch display device, comprising:
    a substrate;
    a plurality of first touch electrode lines positioned on the substrate and including two or more first touch electrodes electrically connected along a first direction;
    a plurality of second touch electrode lines positioned on the substrate and including two or more second touch electrodes electrically connected along a second direction crossing the first direction; and
    a touch driving circuit configured to drive the plurality of first touch electrode lines and the plurality of second touch electrode lines,
    wherein the touch driving circuit is configured to output a contactless touch driving signal to a first group of the plurality of first touch electrode lines and a first group of the plurality of second touch electrode lines and output a constant voltage to a second group of the plurality of first touch electrode lines and a second group of the plurality of second touch electrode lines in a contactless touch driving period.

15. The touch display device of claim 14, wherein the touch driving circuit is configured to output a contacting touch driving signal having an amplitude smaller than an amplitude of the contactless touch driving signal to the plurality of first touch electrode lines and output a constant voltage to the plurality of second touch electrode lines in a contacting touch driving period distinguished from the contactless touch driving period.

16. The touch display device of claim 15, wherein an area of the first group of the plurality of first touch electrode lines and the first group of the plurality of second touch electrode lines supplied with the contactless touch driving signal in the contactless touch driving period is larger than an area of the plurality of first touch electrode lines supplied with the contacting touch driving signal in the contacting touch driving period.

17. The touch display device of claim 14, wherein the touch driving circuit is configured to float a third group of the plurality of first touch electrode lines and a third group of the plurality of second touch electrode lines in the contactless touch driving period, and
wherein the third group of the plurality of first touch electrode lines are positioned between the first group and second group of the plurality of first touch electrode lines, and the third group of the plurality of second touch electrode lines are positioned between the first group and second group of the plurality of second touch electrode lines.

18. A touch driving circuit, comprising:
a first touch driving unit configured to drive a plurality of first touch electrode lines including two or more first touch electrodes electrically connected along a first direction; and
a second touch driving unit configured to drive a plurality of second touch electrode lines including two or more second touch electrodes electrically connected along a second direction crossing the first direction,
wherein the first touch driving unit is configured to output a first touch driving signal to the plurality of first touch electrode lines in a first touch driving period and output a second touch driving signal different from the first touch driving signal to a first group of the plurality of first touch electrode lines and a constant voltage to a second group of the plurality of first touch electrode lines in a second touch driving period.

19. The touch driving circuit of claim 18, wherein the second touch driving unit is configured to output a constant voltage to the plurality of second touch electrode lines in the first touch driving period and output the second touch driving signal to a first group of the plurality of second touch electrode lines and a constant voltage to a second group of the plurality of second touch electrode lines in the second touch driving period.

20. The touch driving circuit of claim 18, wherein the first touch driving unit is configured to float at least one first touch electrode line positioned between the first group of the plurality of first touch electrode lines and the second group of the plurality of first touch electrode lines in the second touch driving period.

* * * * *